United States Patent
Han et al.

(10) Patent No.: US 12,112,609 B2
(45) Date of Patent: Oct. 8, 2024

(54) FLEXIBLE ELECTRONIC DEVICE AND METHOD FOR OPERATING SAME

(71) Applicant: Samsung Electronics Co., Ltd., Gyeonggi-do (KR)

(72) Inventors: Jonghyun Han, Gyeonggi-do (KR); Younghak Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 573 days.

(21) Appl. No.: 17/291,461

(22) PCT Filed: Nov. 5, 2019

(86) PCT No.: PCT/KR2019/014918
§ 371 (c)(1),
(2) Date: May 5, 2021

(87) PCT Pub. No.: WO2020/096324
PCT Pub. Date: May 14, 2020

(65) Prior Publication Data
US 2022/0005340 A1      Jan. 6, 2022

(51) Int. Cl.
*G06F 1/16* (2006.01)
*G06F 3/14* (2006.01)
*G08B 5/22* (2006.01)
*G08B 21/18* (2006.01)

(52) U.S. Cl.
CPC ........... *G08B 21/18* (2013.01); *G06F 1/1652* (2013.01); *G06F 1/1681* (2013.01); *G06F 3/14* (2013.01); *G08B 5/22* (2013.01)

(58) Field of Classification Search
CPC ......... G08B 21/18; G08B 5/22; G06F 1/1652; G06F 1/1681; G06F 3/14

USPC .......................................................... 340/635
See application file for complete search history.

(56) References Cited

U.S. PATENT DOCUMENTS

| | | |
|---|---|---|
| 8,854,332 B1 | 10/2014 | Cho et al. |
| 9,007,226 B2 | 4/2015 | Chang |
| 9,298,221 B2 | 3/2016 | Choi et al. |
| 9,772,180 B2 | 9/2017 | Krimon et al. |
| 10,331,177 B2 * | 6/2019 | Ghosh .................. G06F 1/1681 |

(Continued)

FOREIGN PATENT DOCUMENTS

| | | |
|---|---|---|
| KR | 2014-0115226 | 9/2014 |
| KR | 2015-0077999 | 7/2015 |

(Continued)

OTHER PUBLICATIONS

PCT/ISA/210 Search Report issued on PCT/KR2019/014918, Feb. 26, 2020, pp. 5.

(Continued)

*Primary Examiner* — Naomi J Small
(74) *Attorney, Agent, or Firm* — The Farrell Law Firm, P.C.

(57) ABSTRACT

A flexible electronic device for sensing folding includes a processor that senses folding of the electronic device based on an angle sensed through a sensor circuit, determines, based on the folding history of the electronic device, the possibility that the durability of the folding area will degrade and controls output of a durability notification in response to determining that there is a possibility that the durability of the folding area will degrade.

7 Claims, 22 Drawing Sheets

(56) References Cited

U.S. PATENT DOCUMENTS

| | | | | |
|---|---|---|---|---|
| 2013/0127606 | A1* | 5/2013 | Chang | G09G 3/006 340/384.7 |
| 2013/0342429 | A1* | 12/2013 | Choi | H05K 13/00 29/846 |
| 2014/0198036 | A1 | 7/2014 | Kim et al. | |
| 2015/0015525 | A1 | 1/2015 | Cho et al. | |
| 2015/0146349 | A1* | 5/2015 | Choi | G06F 1/1677 361/679.01 |
| 2015/0185787 | A1 | 7/2015 | Choi et al. | |
| 2016/0093240 | A1* | 3/2016 | Aurongzeb | G09G 3/00 345/590 |
| 2017/0097660 | A1* | 4/2017 | Alonso | G06F 3/03 |
| 2017/0309226 | A1* | 10/2017 | In | G09G 3/035 |
| 2018/0018929 | A1* | 1/2018 | Xun | G06F 1/1626 |
| 2019/0018454 | A1 | 1/2019 | Jung et al. | |
| 2019/0189042 | A1* | 6/2019 | Aurongzeb | G06F 1/1681 |
| 2019/0278323 | A1* | 9/2019 | Aurongzeb | G06F 1/1652 |
| 2020/0141718 | A1 | 5/2020 | Krimon et al. | |

FOREIGN PATENT DOCUMENTS

| | | |
|---|---|---|
| KR | 2017-0086321 | 7/2017 |
| KR | 2017-0099866 | 9/2017 |
| KR | 1879615 | 7/2018 |

OTHER PUBLICATIONS

PCT/ISA/237 Written Opinion issued on PCT/KR2019/014918, Feb. 26, 2020, pp. 8.
KR Notice of Patent Grant dated Jul. 24, 2023 issued in counterpart application No. 10-2018-0135958, 4 pages.
Korean Office Action dated Jan. 13, 2023 issued in counterpart application No. 10-2018-0135958, 11 pages.

* cited by examiner (A)

(B)

(A)

(B)

FLEXIBLE ELECTRONIC DEVICE AND METHOD FOR OPERATING SAME

PRIORITY

This application is a National Phase Entry of International Application No. PCT/KR2019/014918, which was filed on Nov. 5, 2019, and claims priority to Korean Patent Application No. 10-2018-0135958, filed in the Korean Intellectual Property Office on Nov. 7, 2018, the entire content of each of which is incorporated herein by reference.

TECHNICAL FIELD

Various embodiments of the disclosure relate to a flexible electronic device for detecting folding and an operating method thereof.

BACKGROUND ART

Electronic devices are provided with complex functions, such as making photos or videos, playing music files or video files, gaming, receiving a broadcast, supporting wireless Internet, etc., and are implemented in the form of integrated multimedia players. Accordingly, electronic devices are developing into new forms in terms of hardware or software to enhance portability and convenience, while satisfying users' needs. As an example of such development, electronic devices may be implemented in a flexible type.

DISCLOSURE OF INVENTION

Technical Problem

An electronic device of a flexible type may have its mechanical state changed by a user gesture. For example, the electronic device of the flexible type may change from a flat state to a folded state (for example, a folding state), or may change from a folded state to a flat state.

However, as the change in the mechanical state is repeated, there may be a problem that durability of a display of the electronic device or other components (for example, a printed circuit board, a processor, a sensor, a memory, a battery, etc.) is degraded. For example, if the change in the mechanical state is repeated in a certain portion of the electronic device, a damage may be caused on at least a portion of the display the state of which is repeatedly changed.

Accordingly, various embodiments of the disclosure provide a method and an apparatus for preventing degradation of durability which is caused by a change in a mechanical state of an electronic device.

The technical object to be achieved by the disclosure is not limited to that mentioned above, and other technical objects that are not mentioned above may be clearly understood to those skilled in the art based on the description provided below.

Solution to Problem

An electronic device according to various embodiments of the disclosure may include: a hinge; a first housing including a first surface facing in a first direction and a third surface facing in a second direction which is the opposite direction of the first direction; a second housing including a second surface facing in the first direction and a fourth surface facing in the second direction, the second housing being folded with the first housing with reference to the hinge; a flexible display extended from the first surface to the third surface; at least one sensor circuit configured to detect an angle formed by the first housing and the second housing; and a processor operatively connected with the flexible display, the sensor circuit, and the processor may control to: detect folding of the electronic device based on an angle detected through the sensor circuit; determine a possibility that durability of a folding area is degraded, based on a folding history of the electronic device; and to output a durability notification in response to it being determined that there is a possibility that the durability of the folding area is degraded.

An operating method of an electronic device according to various embodiments of the disclosure may include: detecting folding of the electronic device based on an angle detected through at least one sensor circuit; identifying a folding history of the electronic device in response to the folding of the electronic device being detected; determining a possibility that durability of a folding area is degraded, based on the folding history; and outputting a durability notification in response to it being determined that there is a possibility that the durability of the folding area is degraded.

Advantageous Effects of Invention

According to various embodiments, an electronic device of a flexible type provides a durability notification based on a history of change of a mechanical state, so that degradation of durability can be prevented.

The effect achieved by the disclosure is not limited to that mentioned above, and other effects that are not mentioned above may be clearly understood to those skilled in the art based on the description provided below.

BEST MODE FOR CARRYING OUT THE INVENTION

Various embodiments of the disclosure will be described herein below with reference to the accompanying drawings. In the following description, detailed descriptions of well-known functions or configurations will be omitted since they would unnecessarily obscure the subject matters of the disclosure. Also, the terms used herein are defined according to the functions of the disclosure. Thus, the terms may vary depending on users' or operators' intentions or practices. Therefore, the terms used herein should be understood based on the descriptions made herein.

Figure 1:
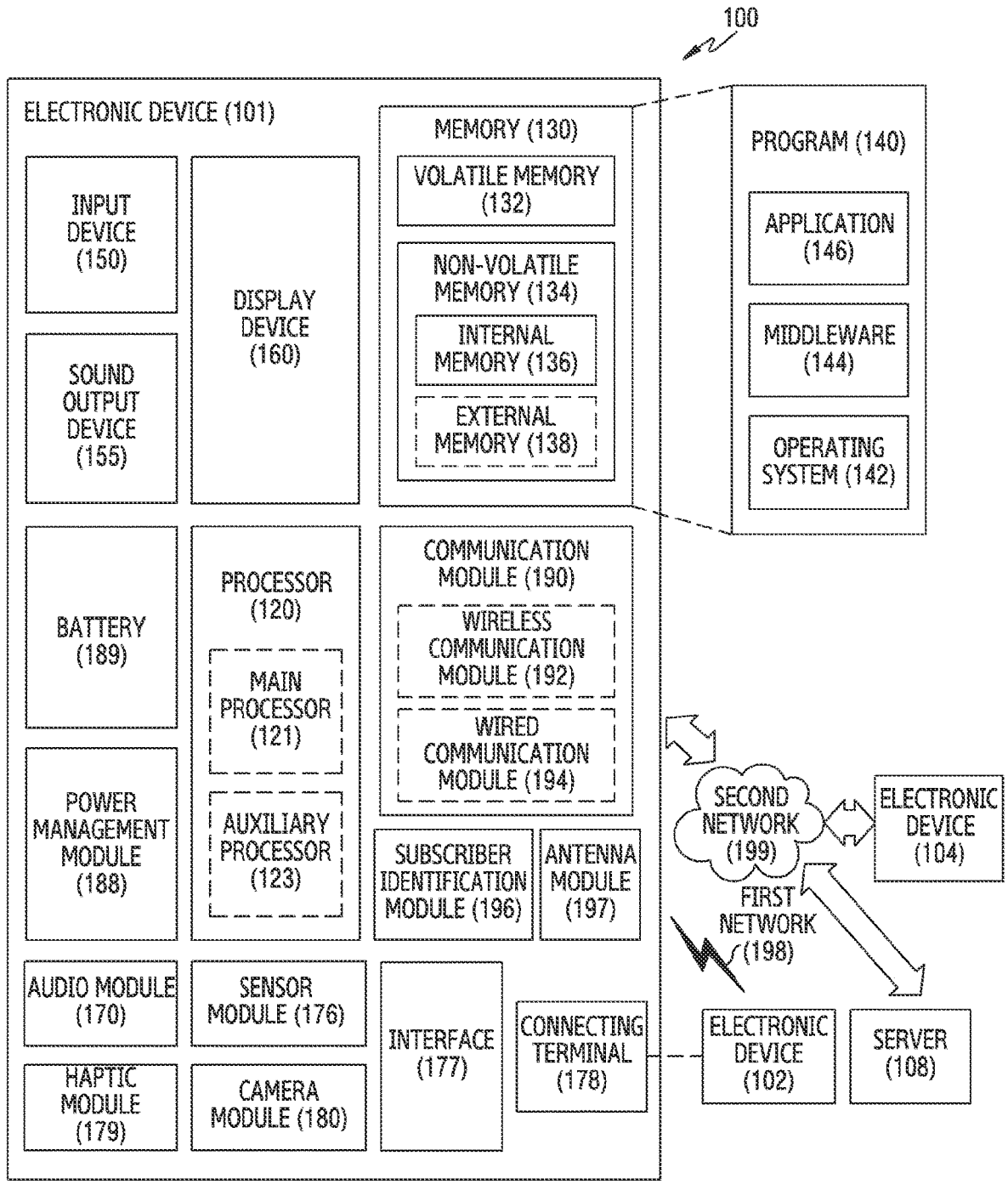
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (CPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C." and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the processor 120 may detect folding of one area of the electronic device 101. The folding may include a state in which the electronic device 101 is physically deformed, not in a substantially flat state (for example, an unfolding state). For example, the folding of the electronic device 101 may be expressed by folding, bending, rolling, crooking, or the like.

According to an embodiment, as will be described below through FIG. 2, the electronic device 101 may be a foldable type including a first housing (or a first housing structure 310) and a second housing (or a second housing structure 320). In addition, at least one sensor may be disposed in each of the first housing structure 310 and the second housing structure 320. For example, a first sensor may be disposed in the first housing structure 310 and a second sensor may be disposed in the second housing structure 320. The first sensor and the second sensor may be sensors for acquiring information on an angle between the first housing structure 310 and the second housing structure 320. The first sensor and the second sensor may include, for example, at least one of a gyro sensor, a distance sensor, or a strain sensor. For example, the processor 120 may calculate an angle between the first housing structure 310 and the second housing structure 320 of the electronic device 101 by using a sensor (for example, the first sensor, the second sensor, or the sensor module 176), and may detect folding of the electronic device 101 based on the calculated angle. According to an embodiment, the processor 120 may detect folding of a first type (for example, in-folding) indicating that the angle between the first housing structure 310 and the second housing structure 320 is included in a pre-designated first angle range (for example, about 5° to 175°). In addition, the processor 120 may detect folding of a second type (for example, out-folding) indicating that the angle between the first housing structure 310 and the second housing structure 320 of the electronic device 101 is included in a pre-designated second angle range (for example, 185° to 355°). Examples of the designated angle ranges described above are just for understanding and the disclosure is not limited thereto.

According to another embodiment, as will be described below through FIG. 4, the electronic device 101 may be a flexible type including a display 160 implemented by a flexible display which is bendable. In addition, the flexible display may be coupled with at least one sensor (for example, the sensor module 176) or the at least one sensor (for example, the sensor module 176) may be mounted in the flexible display. For example, the at least one sensor (for example, the sensor module 176) may include at least one of a gyro sensor, a distance sensor, or a strain sensor as described above. The processor 120 may determine a curvature of a bent area of the electronic device 101 by using the at least one sensor (for example, the sensor module 176), and may detect folding of the electronic device 101 based on the determined curvature and a predetermined threshold curvature. In another example, the at least one sensor ((for example, the sensor module 176) may include a pressure sensor. The processor 120 may determine a pressure on a bent area of the electronic device 101 by using the at least one sensor (for example, the sensor module 176), and may detect folding of the electronic device 101 based on the determined pressure and a predetermined threshold pressure. The above-described methods of detecting folding of the electronic device 101 may be one embodiment and the disclosure is not limited thereto. Specifically, folding of the electronic device 101 may be detected in well-known various methods. In addition, the electronic device 101 according to various embodiments may be configured in a combination of the above-described foldable type and the above-described flexible type.

According to various embodiments, when folding of the electronic device 101 is detected, the processor 120 may determine whether there is a possibility that durability of an area where folding is detected (for example, a folding area) is degraded. According to an embodiment, the processor 120 may determine the possibility of degradation of durability based on the number of times of folding (for example, the cumulative number of times of folding) of the electronic device 101. For example, when folding less than a pre-designated folding threshold value (for example, 10,000 times) is detected, the processor 120 may determine that the possibility of degradation of durability of a corresponding area is low. In addition, when folding greater than or equal to the pre-designated folding threshold value (for example, 10,000 times) is detected, the processor 120 may determine that the possibility of degradation of durability of a corresponding area is high. However, this is merely an example and embodiments of the disclosure are not limited thereto. In an embodiment, the possibility of degradation of durability of a folding area may be determined based on a folding holding time (for example, a cumulative folding time) of the folding area. For example, when the folding holding time of the folding area exceeds a pre-designated threshold time, the processor 120 may determine that the possibility of degradation of durability of the folding area is high.

According to various embodiments, when it is determined that the possibility of degradation of durability of the area where folding is detected (for example, the folding area) is high, the processor 120 may output a durability notification. According to an embodiment, the durability notification may include a first durability notification for informing that durability of one portion (for example, the folding area) of the electronic device 101 is degraded, and a second durability notification for indicating one area of the electronic device 101 where durability is degraded. According to an embodiment, the processor 120 may determine an output method for the durability notification, based on a folding type of the electronic device 101. The folding type may include folding of a first type (for example, in-folding) indicating that a portion of the electronic device 101 is folded in a first direction, and folding of a second type (for example, out-folding) indicating that a portion of the electronic device 101 is folded in a second direction. For example, the folding area of the electronic device 101 may be hidden by a folding surface (for example, a rear surface of the electronic device 101) and may not be exposed by the folding of the first type. In this case, the processor 120 may output unfolding guide information to expose the folding area. In addition, the processor 120 may output the durability notification in the state where the folding area is exposed. However, this is merely an example and embodiments of the disclosure are not limited thereto. In an embodiment, the processor 120 may output the durability notification even in a state where the folding area is not exposed. In another example, the folding area of the electronic device 101 may not be hidden by the folding surface and may be exposed by the folding of the second type. In this case, the processor 120 may output the durability notification in the folded state of the electronic device 101.

Figure 2:
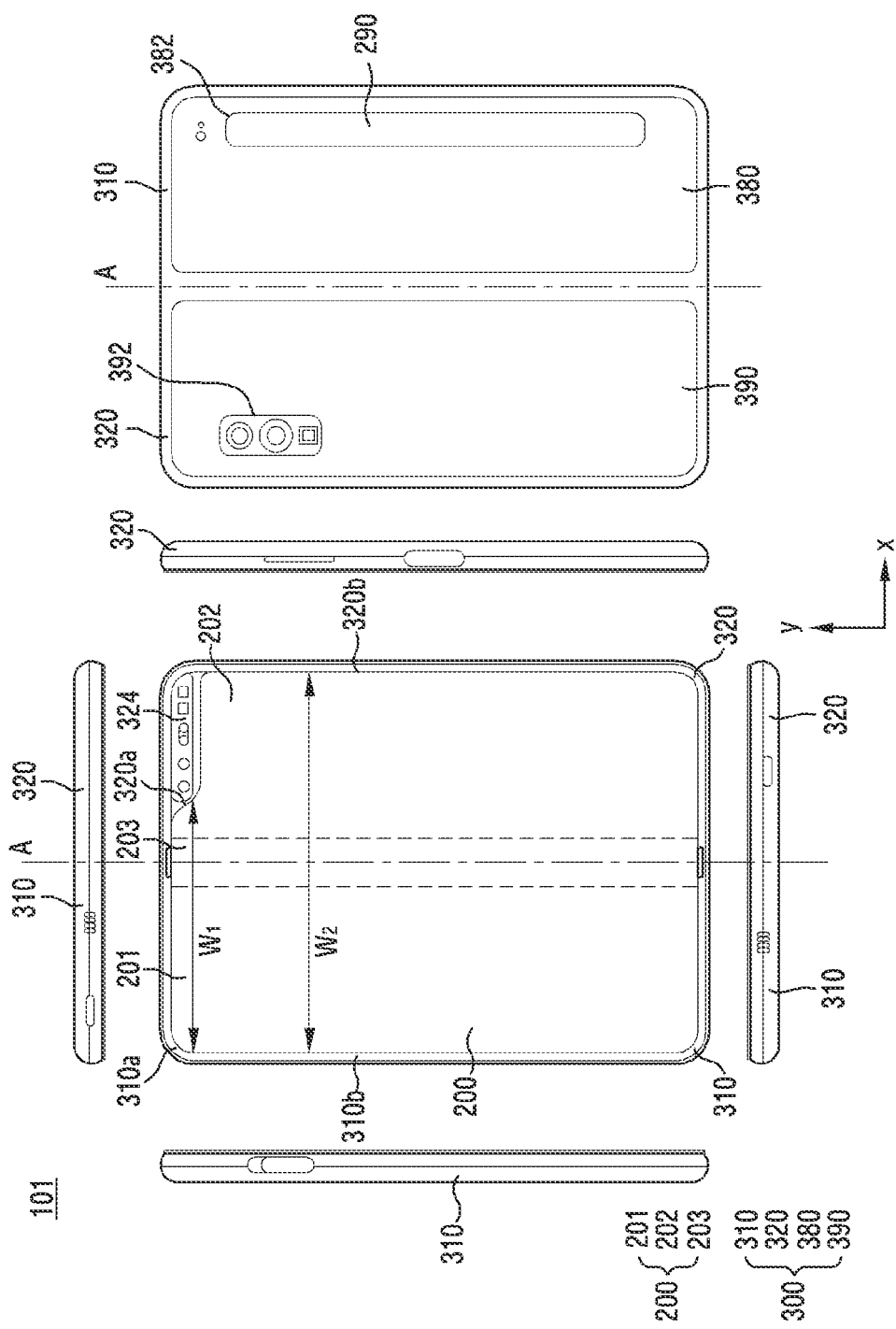
FIG. 2 is a view illustrating a flat state of an electronic device according to various embodiments.
Figure 3:
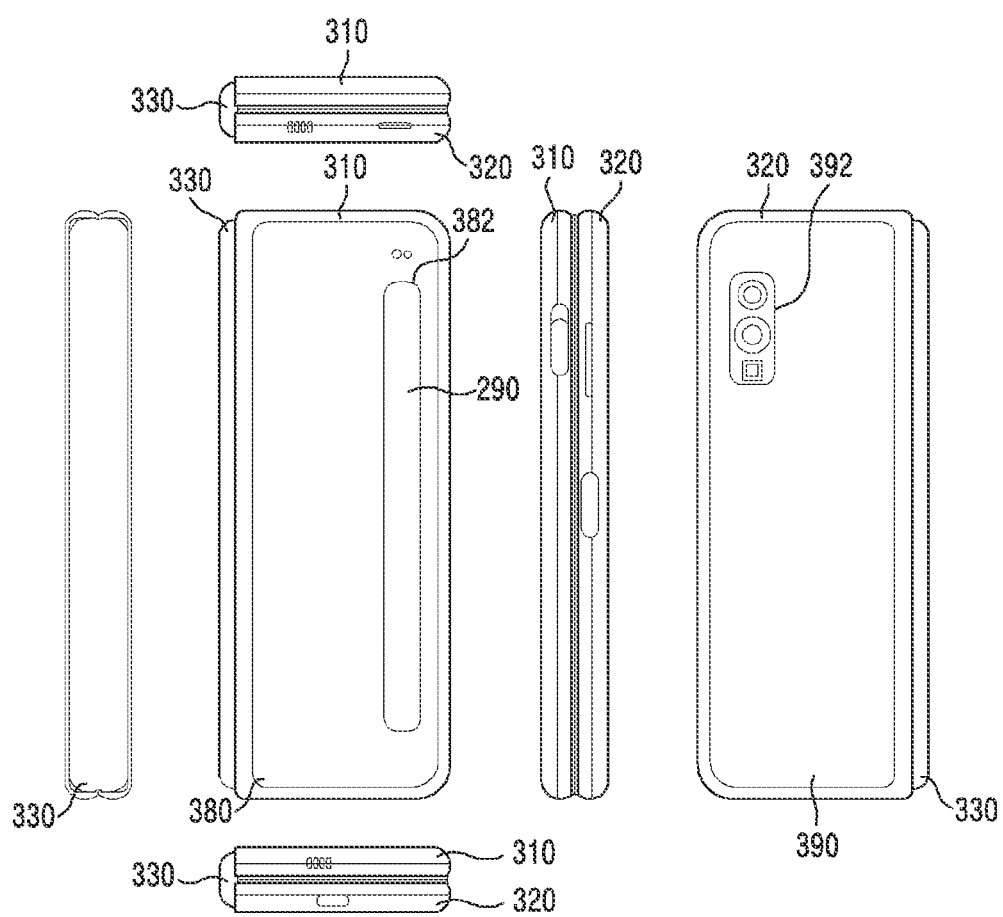
FIG. 3 is a view illustrating a folded state of the electronic device according to various embodiments.

FIG. 2 is a view illustrating a flat state of an electronic device according to various embodiments. FIG. 3 is a view illustrating a folded state of the electronic device according to various embodiments. According to an embodiment, the electronic device of FIGS. 2 and 3 may be the electronic device 101 of FIG. 1.

Referring to FIGS. 2 and 3, in an embodiment, the electronic device 101 may include a foldable housing 300, a hinge cover 330 for covering a foldable portion of the foldable housing 300, and a flexible or foldable display 200 (hereinafter, referred to as a "display" 200) disposed in a space formed by the foldable housing 300. In the disclosure, a surface on which the display 200 is disposed is defined as a first surface or a front surface of the electronic device 101. In addition, the opposite surface of the front surface is defined as a second surface or a rear surface of the electronic device 101. In addition, a surface surrounding a space between the front surface and the rear surface is defined as a third surface or a side surface of the electronic device 101.

In an embodiment, the foldable housing 300 may include a first housing structure 310, a second housing structure 320 including a sensor area 324, a first rear surface cover 380, and a second rear surface cover 390. The foldable housing 300 of the electronic device 101 is not limited to the form and coupling illustrated in FIGS. 2 and 3, and may be implemented by a combination and/or coupling of other forms or components. For example, in another embodiment, the first housing structure 310 and the first rear surface cover 380 may be integrally formed with each other, and the second housing structure 320 and the second rear surface cover 390 may be integrally formed with each other.

In the illustrated embodiment, the first housing structure 310 (for example, a first plate) and the second housing structure 320 (for example, a second plate) may be disposed on both sides with reference to a folding axis (A axis), and may be a substantially symmetrical shape with respect to the folding axis A. As will be described below, the first housing structure 310 and the second housing structure 320 may have an angle or distance therebetween changed according to whether the electronic device 101 is in a flat state, a folded state, or an intermediate state. In the illustrated embodiment, the second housing structure 320 additionally includes the sensor area 324 where various sensors are disposed, differently from the first housing structure 310, but may have a symmetrical shape on the other area.

In an embodiment, the first housing structure 310 and the second housing structure 320 may form a recess to accommodate the display 200 all together as shown in FIG. 2. In the illustrated embodiment, the recess may have two or more different widths in a direction perpendicular to the folding axis A due to the sensor area 324.

For example, the recess may have (1) a first width w1 between a first portion 310a of the first housing structure 310 that is parallel to the folding axis A, and a first portion 320a of the second housing structure 320 that is formed on an edge of the sensor area 324, and (2) a second width w2 formed by a second portion 310b of the first housing structure 310 and a second portion 320b of the second housing structure 320 that does not correspond to the sensor area 324 and is parallel to the folding axis A. In this case, the second width w2 may be longer than the first width w1. In other words, the first portion 310a of the first housing structure 310 and the first portion 320a of the second housing structure 320, which have an asymmetrical shape, may form the first width w1 of the recess, and the second portion 310b of the first housing structure 310 and the second portion 320h of the second housing structure 320, which have a symmetrical shape, may form the second width w2 of the recess. In an embodiment, the first portion 320a and the second portion 320b of the second housing structure 320 may have different distances from the folding axis A. The width of the recess is not limited to the illustrated example. In various embodiments, the recess may have a plurality of widths according to a shape of the sensor area 324 or portions having the asymmetrical shape of the first housing structure 310 and the second housing structure 320.

In an embodiment, at least a portion of the first housing structure 310 and the second housing structure 320 may be formed with a metallic material or a nonmetallic material having stiffness of a size selected to support the display 200.

In an embodiment, the sensor area 324 may be formed to have a predetermined area adjacent to one corner of the second housing structure 320. However, the disposal, shape, and size of the sensor area 324 are not limited to the illustrated example. For example, in another embodiment, the sensor area 324 may be provided on another corner of the second housing structure 320 or a certain area between an upper end corner and a lower end corner. In an embodiment, components which are embedded in the electronic device 101 to perform various functions may be exposed to the front surface of the electronic device 101 through the sensor area 324 or one or more openings provided on the sensor area 324. In various embodiments, the components may include various types of sensors. The sensors may include, for example, at least one of a front-facing, camera, a receiver, or a proximity sensor.

The first rear surface cover 380 may be disposed on one side of the folding axis on the rear surface of the electronic device 101, and for example, may have a substantially rectangular periphery and may have its periphery surrounded by the first housing structure 310. Similarly, the second rear surface cover 390 may be disposed on the other side of the folding axis on the rear surface of the electronic device 101, and may have its periphery surrounded by the second housing structure 320.

In the illustrated embodiment, the first rear surface cover 380 and the second rear surface cover 390 may have a substantially symmetrical shape with reference to the folding axis (A axis). However, the first rear surface cover 380 and the second rear surface cover 390 may not necessarily have the symmetrical shape, and in another embodiment, the electronic device 101 may include the first rear surface cover 380 and the second rear surface cover 390 of various shapes. In still another embodiment, the first rear surface cover 380 may be integrally formed with the first housing structure 310, and the second rear surface cover 390 may be integrally formed with the second housing structure 320.

In an embodiment, the first rear surface cover 380, the second rear surface cover 390, the first housing structure 310, and the second housing structure 320 may form a space to have various components (for example, a printed circuit board or a battery) of the electronic device 101 disposed therein. In an embodiment, one or more components may be disposed on the rear surface of the electronic device 101 or may be visually exposed. For example, at least a portion of a sub display 290 may be visually exposed through a first rear surface area 382 of the first rear surface cover 380. In another embodiment, one or more components or a sensor may be visually exposed through a second rear surface area 392 of the second rear surface cover 390. In various embodiments, the sensor may include a proximity sensor and/or a rear-facing, camera.

Referring to FIG. 3, the hinge cover 330 may be disposed between the first housing structure 310 and the second housing structure 320, and may be configured to hide inner components (for example, a hinge structure). In an embodiment, the hinge cover 330 may be hidden by a portion of the first housing structure 310 and the second housing structure 320, or may be exposed to the outside, according to a state (a flat state or a folded state) of the electronic device 101.

For example, when the electronic device 101 is in the flat state as shown in FIG. 2, the hinge cover 330 may be hidden by the first housing structure 310 and the second housing structure 320 and may not be exposed. For example, when the electronic device 101 is in the folded state (for example, a fully folded state) as shown in FIG. 3, the hinge cover 330 may be exposed to the outside between the first housing structure 310 and the second housing structure 320. For example, in an intermediate state in which the first housing structure 310 and the second housing structure 320 are folded with a certain angle, the hinge cover 330 may be exposed to the outside in part between the first housing structure 310 and the second housing structure 320. However, in this case, an exposed area may be smaller than in the fully folded state. In an embodiment, the hinge cover 330 may include a curved surface.

The display 200 may be disposed in the space formed by the foldable housing 300. For example, the display 200 may be seated on the recess formed by the foldable housing 300, and may form most of the front surface of the electronic device 101.

Accordingly, the front surface of the electronic device 101 may include the display 200, and some areas of the first housing structure 310 adjacent to the display 200 and some areas of the second housing structure 320. In addition, the rear surface of the electronic device 101 may include the first rear surface cover 380, some areas of the first housing structure 310 that are adjacent to the first rear surface cover 380, the second rear surface cover 390, and some areas of the second housing structure 320 that are adjacent to the second rear surface cover 390.

The display 200 may refer to a display that has at least some areas deformed to a flat surface or a curved surface. In an embodiment, the display 200 may include a folding area 203, a first area 201 disposed on one side (the left of the folding area 203 show in FIG. 2) with reference to the folding area 203, and a second area 202 disposed on the other side (the right of the folding area 203 shown in FIG. 2).

The divided areas of the display 200 shown in FIG. 2 are examples and the display 200 may be divided into a plurality of areas (for example, four or more or two areas) according to a structure or a function of the display 200. For example, in the embodiment illustrated in FIG. 2, the display 200 may be divided into areas by the folding area 203 extended in parallel with the y-axis or the folding axis (A axis). In another embodiment, the display 200 may be divided into areas with reference to another folding area (for example, a folding area parallel to the x-axis) or another folding axis (for example, a folding axis parallel to the x-axis).

The first area 201 and the second area 202 may have a substantially symmetrical shape with reference to the folding area 203. However, the second area 202 may include a notch that is cut according to the presence of the sensor area 324, differently from the first area 201, but may have a symmetrical shape with the first area 201 on the other area. In other words, the first area 201 and the second area 202 may include portions that have a symmetrical shape and portions that have an asymmetrical shape.

Hereinafter, operations of the first housing structure 210 and the second housing structure 320 and respective areas of the display 200 according to a state (for example, a flat state or a folded state) of the electronic device 101 will be described.

In an embodiment, when the electronic device 101 is in the flat state (for example, FIG. 2), the first housing structure 310 and the second housing structure 320 may form the angle of 180° and may be disposed to face in the same direction. A surface of the first area 201 of the display 200 and a surface of the second area 202 may form the angle of 180° with each other, and may face in the same direction (for example, the front surface direction of the electronic device 101). The folding area 203 may form the same plane as the first area 201 and the second area 202.

In an embodiment, when the electronic device 101 is in the folded state (for example, FIG. 3), the first housing structure 310 and the second housing structure 320 may be disposed to face each other. The surface of the first area 201 of the display 200 and the surface of the second area 202 may form a small angle (for example, between 0° and 10°) with each other, and may face each other. At least a portion of the folding area 203 may have a curved surface having a predetermined curvature.

In an embodiment, when the electronic device 101 is in the intermediate state (for example, FIG. 3), the first housing structure 310 and the second housing structure 320 may be disposed with a certain angle. The surface of the first area 201 of the display 200 and the surface of the second area 202 may form an angle that is larger than in the folded state and is smaller than in the flat state. At least a portion of the folding area 203 may have a curved surface having a predetermined curvature, and the curvature in this state may be smaller than in the folded state.

In an embodiment, at least one of the first housing structure 310 or the second housing structure 320 may include at least one reception coil for receiving power from a transmission coil of a wireless power transmission device.

Figure 4:
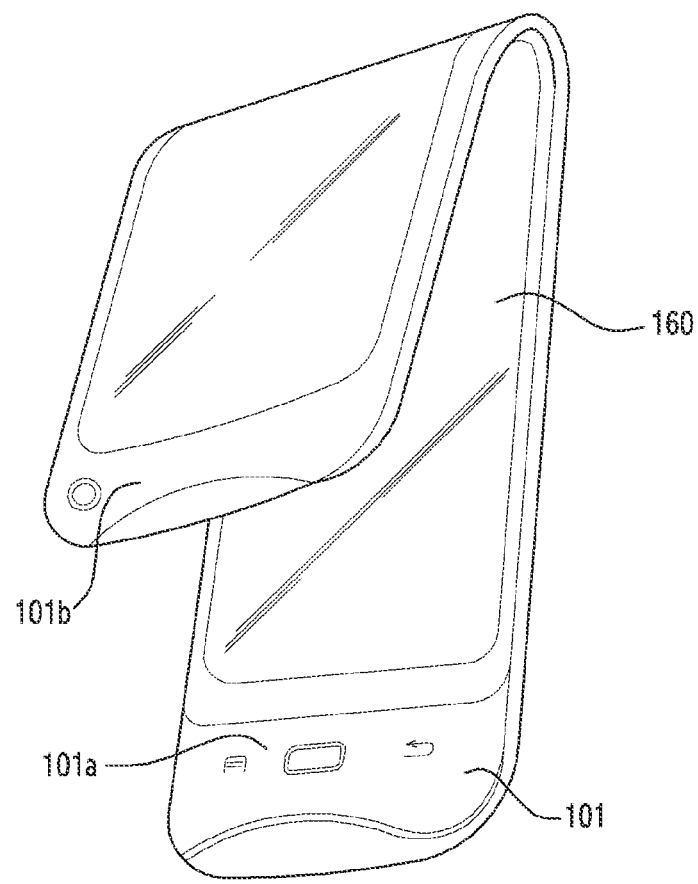
FIG. 4 is a view illustrating another form of the electronic device according to various embodiments.

FIG. 4 is a view illustrating another form of the electronic device according to various embodiments.

Referring to FIG. 4, a housing forming the exterior of the electronic device 101 in an embodiment may include a front surface cover 101a and a rear surface cover 101b. According to an embodiment, an inner space formed by the front surface cover 101a and the rear surface cover 101b may have at least one component described above through FIG. 1 (for example, the processor 120, the memory 130, the input device 150, the acoustic output device 155, the display device 160, the audio module 170, the sensor module 176, the interface 177, the haptic module 179, the camera module 180, the power management module 188, the battery 189, the communication module 190, the subscriber identification module 196, or the antenna module 197) embedded therein. According to an embodiment, the display device 160 may be disposed on the front surface cover 101a. The display device 160 may be formed by a flexible display and may be bendable. However, this is merely an example and embodiments of the disclosure are not limited thereto. In an embodiment, the display device 160 formed by the flexible display may also be disposed on the rear surface cover 101b of the electronic device 101.

According to various embodiments, an electronic device (for example, the electronic device 101) may include: a hinge; a first housing (for example, the first housing structure 310) including a first surface facing in a first direction and a third surface facing in a second direction which is the opposite direction of the first direction; a second housing (for example, the second housing structure 320) including a second surface facing in the first direction and a fourth surface facing in the second direction, the second housing being folded with the first housing with reference to the hinge; a flexible display (for example, the display device 160) extended from the first surface to the third surface; at least one sensor circuit (for example, the sensor module 176) to detect an angle formed by the first housing and the second housing; and a processor (for example, the processor 120) operatively connected with the flexible display, the sensor circuit. According to an embodiment, the processor may control to: detect folding of the electronic device based on an angle detected through the sensor circuit; determine a possibility that durability of a folding area is degraded, based on a folding history of the electronic device; and to output a durability notification in response to it being determined that there is a possibility that the durability of the folding area is degraded.

According to an embodiment, the durability notification may include a first durability notification for informing that durability of the folding area is degraded, and a second durability notification for indicating the folding area where the durability is degraded.

According to an embodiment, the processor may control to determine a display method of the durability notification, based on a folding type of the electronic device. For example, the folding type of the electronic device may include folding of a first type by which a portion of the electronic device is folded in the first direction, and folding of a second type by which a portion of the electronic device is folded in the second direction which is the opposite direction of the first direction.

According to an embodiment, the processor may control to display the first durability notification and the second durability notification on a first area which is different from a second area of the flexible display, based on the folding of the first type. For example, the second area may include some areas corresponding to a position of the hinge from among all areas of the flexible display.

According to an embodiment, a rear surface of at least one of the first housing and the second housing may include a sub display (for example, the sub display 290). For example, the processor may control to output the first durability notification through the sub display in response to the sub display being exposed by folding of the electronic device.

According to an embodiment, the processor may control to output guide information for inducing a flat state of the electronic device which is folded in the first type, and to change a display position of the second durability notification to the second area of the flexible display in response to the flat state of the electronic device being detected.

According to an embodiment, the processor may control to output the guide information based on at least one of vibration, light emission, or sound.

According to an embodiment, the processor may control to display the first durability notification on a first area of the flexible display, based on the folding of the second type, and to display the second durability notification on a second area of the flexible display. For example, the first area may include some areas corresponding to a position of the hinge from among all areas of the flexible display, and the second area may be an area different from the first area.

According to an embodiment, the processor may control to acquire additional information regarding the folding area in response to it being determined that there is a possibility that durability of the folding area is degraded, and to output the durability notification based on the additional information. For example, the additional information may include a pressure applied to the folding area.

According to an embodiment, the processor may control to identify a folding state of the electronic device in response to it being determined that there is a possibility that durability of the folding area is degraded, and to output the durability notification based on the identified folding state. For example, the folding state may include a weak folding state in which an angle formed by the first housing and the second housing is included in a first state range, and a strong folding state in which the angle formed by the first housing and the second housing is included in a second state range.

Figure 5:
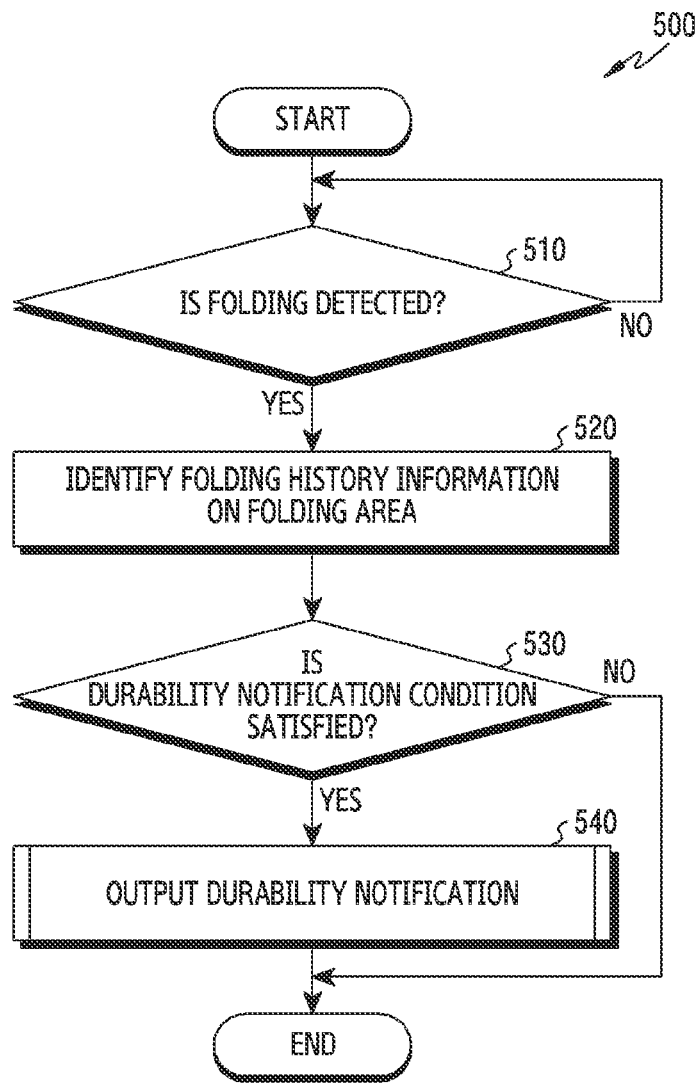
FIG. 5 is a flowchart for detecting folding in an electronic device according to various embodiments.
Figure 6A:
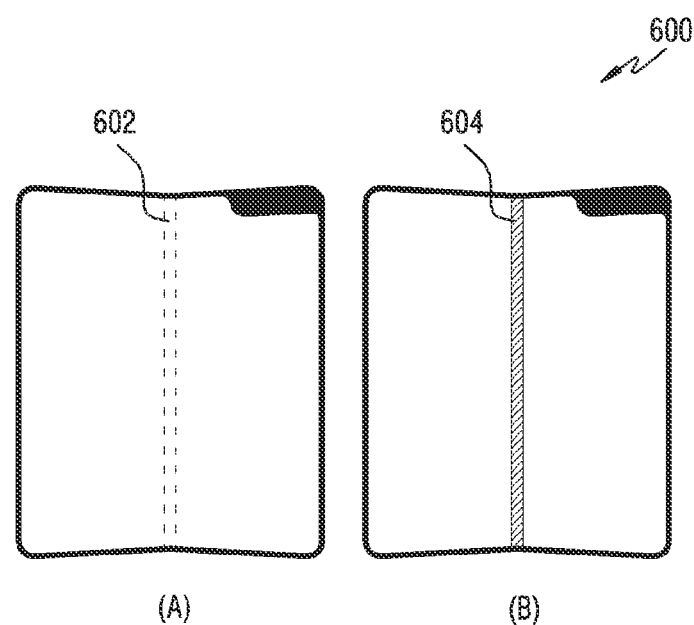
FIGS. 6A to 6C are views to explain a folding state of an electronic device and an output state of a durability notification according to various embodiments.
Figure 6B:
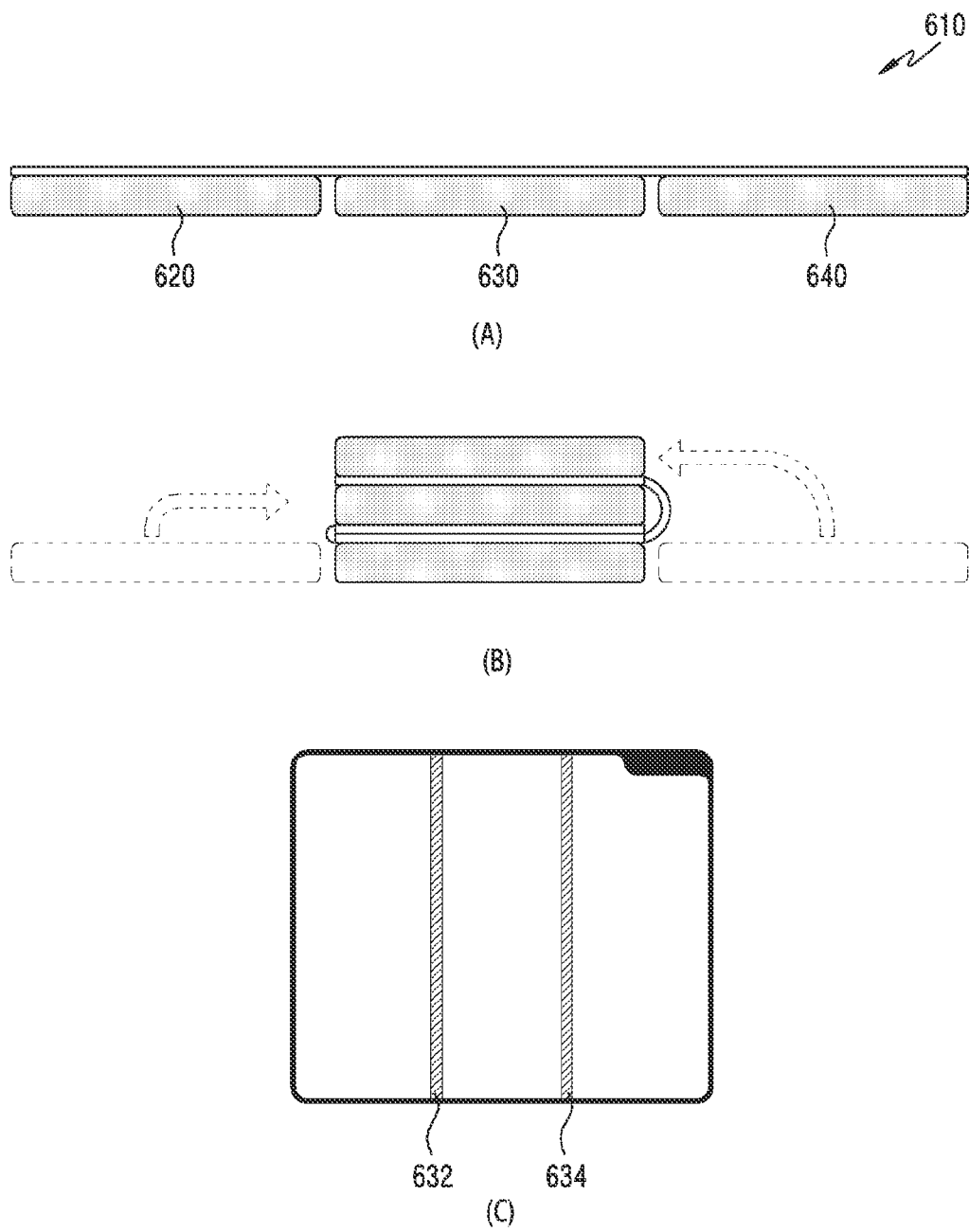
Figure 6C:
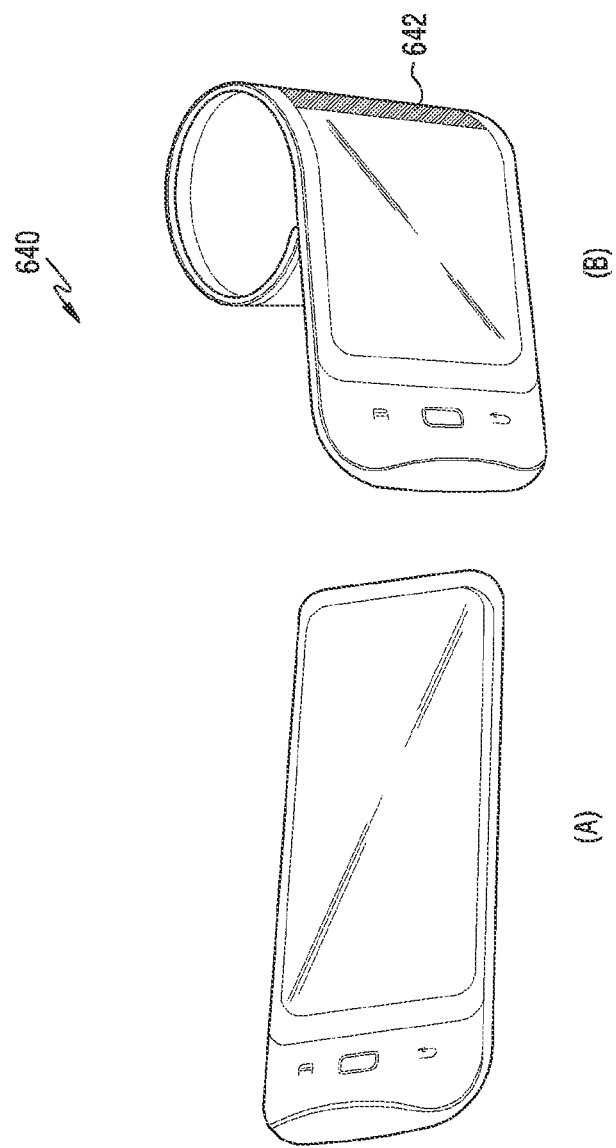

FIG. 5 is a flowchart 500 for detecting folding in an electronic device according to various embodiments. FIGS. 6A to 6C are views 600, 610, 640 to explain a folding state of an electronic device and an output state of a durability notification according to various embodiments. Respective operations in the following embodiment may be performed in sequence, but may not necessarily be performed in sequence. For example, the sequence of the respective operations may be changed and at least two operations may be performed in parallel. The electronic device of FIG. 5 may be the electronic device 101 of FIG. 1.

Referring to FIG. 5, in operation 510, the electronic device (for example, the processor 102 of FIG. 1) according to various embodiments may determine whether folding of one area of the electronic device 101 is detected. For example, the processor 120 may detect folding, based on information outputted from at least one sensor (for example, a pressure sensor) mounted in the display 160, which is implemented by a flexible display, or at least one sensor (for example, the first sensor, the second sensor, or the sensor module 176) provided in the electronic device 101.

The information used for determining the folding may be associated with an angle (for example, a folding angle) between the first housing structure 310 and the second housing structure 320 of the electronic device 101 described above through FIGS. 2 and 3. For example, the processor 120 may determine that folding of the electronic device 101 is detected, in response to a folding angle included in a pre-designated angle range being detected. In another example, the processor 120 may determine that folding of the electronic device 101 is detected, in response to the folding angle included in the pre-designated angle range being maintained for a pre-designated time. In still another example, the processor 120 may determine that folding of the electronic device 101 is detected, in response to an increase or decrease of the folding angle corresponding to a pre-designated change range being detected. However, these are merely examples and embodiments of the disclosure are not limited thereto. For example, the information used for determining the folding may be determined based on a pressure, a curvature of at least a portion generated by bending of the electronic device 101 or the display (for example, the display device 160), as described above through FIG. 4.

According to various embodiments, in operation 520, the electronic device (for example, the processor 102 of FIG. 1) may identify folding history information of the folding area. The folding history information may refer to a history of folding that has occurred in the folding area. For example, the folding history information may include at least one of the cumulative number of times of folding of the folding area, a cumulative folding time. According to an embodiment, the processor 120 may refine the folding history information in response to folding of the electronic device 101 being detected. The folding history information may be stored in the electronic device 101 (for example, the memory 130) or an external electronic device (for example, the electronic device 102, the electronic device 104, or the server 108).

According to various embodiments, in operation 530, the electronic device (for example, the processor 102 of FIG. 1) may determine whether a durability notification condition is satisfied, based on the identified history information. The durability notification condition may be associated with a state where durability of an area on which folding is detected is degraded. According to an embodiment, the processor 120 may determine whether the durability notification condition is satisfied, by using the identified history information and a threshold condition. For example, when the cumulative number of times of folding greater than or equal to the threshold condition (for example, a folding threshold value) is identified, the processor 120 may determine that the durability notification condition of the folding area is satisfied, in addition, when the cumulative number of times of folding less than the threshold condition (for example, the folding threshold value) is identified, the processor 120 may determine that the durability notification condition of the folding area is not satisfied. In another example, when a cumulative folding time greater than or equal to the threshold condition (for example, a folding threshold time) is identified, the processor 120 may determine that the durability notification condition of the folding area is satisfied. In addition, when a cumulative folding time less than the threshold condition (for example, the folding threshold time) is identified, the processor 120 may determine that the durability notification condition of the folding area is not satisfied.

According to various embodiments, the electronic device (for example, the processor 120 of FIG. 1) may perform an operation related to folding in response to it being determined that the durability notification condition is not satisfied. According to an embodiment, the processor 120 may display a user interface related to an ongoing application in response to a folding state. For example, the processor 120 may change a first user interface displayed in the unfolding state (or flat state) to a second user interface corresponding to the folding state, and may display the second user interface. According to another embodiment, the processor 120 may refine the stored folding history information by monitoring the folding state. For example, the processor 120 may increase the cumulative number of times of folding or the folding holding time.

According to various embodiments, the electronic device (for example, the processor 120 of FIG. 1) may output a durability notification in operation 540 in response to it being determined that the durability notification condition is satisfied. The durability notification may include a graphic notification indicating one area of the electronic device 101 where the durability is degraded.

According to an embodiment, the electronic device 101 may include the first housing structure 310 and the second housing structure 320 as described above through FIG. 2. In addition, the first housing structure 310 and the second housing structure 320 may be disposed on both sides of a folding portion (for example, a hinge structure). In this case, a portion of a display (for example, the display device 160) corresponding to the folding portion may be a folding area. When folding of the electronic device 101 is detected but the durability notification condition is not satisfied, the processor 120 may restrict displaying of a durability notification regarding a folding area 602 as shown in view (a) of FIG. 6A. In addition, when the durability notification condition is satisfied, the processor 120 may output a durability notification 604 by overlaying the same on the folding area 602 as shown in view (b) of FIG. 6A. However, this is merely an example and embodiments of the disclosure are not limited thereto. For example, the durability notification may be outputted without being overlaid on the folding area.

According to another embodiment, the electronic device 101 may include a first housing structure 620, a second housing structure 630, and a third housing structure 640 as shown in view (a) of FIG. 6B. In addition, the first housing structure 620 and the second housing structure 630 may be disposed on both sides of a first folding portion (for example, a first hinge structure) although it is not illustrated, and the second housing structure 630 and the third housing structure 640 may be disposed on both sides of a second folding portion (for example, a second hinge structure) although it is not illustrated. In this case, as shown in view (b) of FIG. 6B, the electronic device 101 may be folded with reference to the first folding portion and the second folding portion, and a first area of a display (for example, the display device 160) that corresponds to the first folding portion, and a second area of the display (for example, the display device 160) that corresponds to the second folding portion may be folding areas. As shown in view (c) of FIG. 6B, the processor 120 may output durability notifications 632, 634 based on the first folding area and the second folding area when the durability notification condition is satisfied.

According to still another embodiment, as shown in view (a) of FIG. 6C, the electronic device 101 may include a flexible display. The electronic device 101 may be bent or rolled such that at least a portion of the electronic device 101 has a curvature, and a portion of the display (for example, the display device 160) corresponding to an area having a curvature of a designated range may be a folding area. As shown in view (b) of FIG. 6C, the processor 120 may output a durability notification 642 based on the folding area when the durability notification condition is satisfied.

Figure 7:
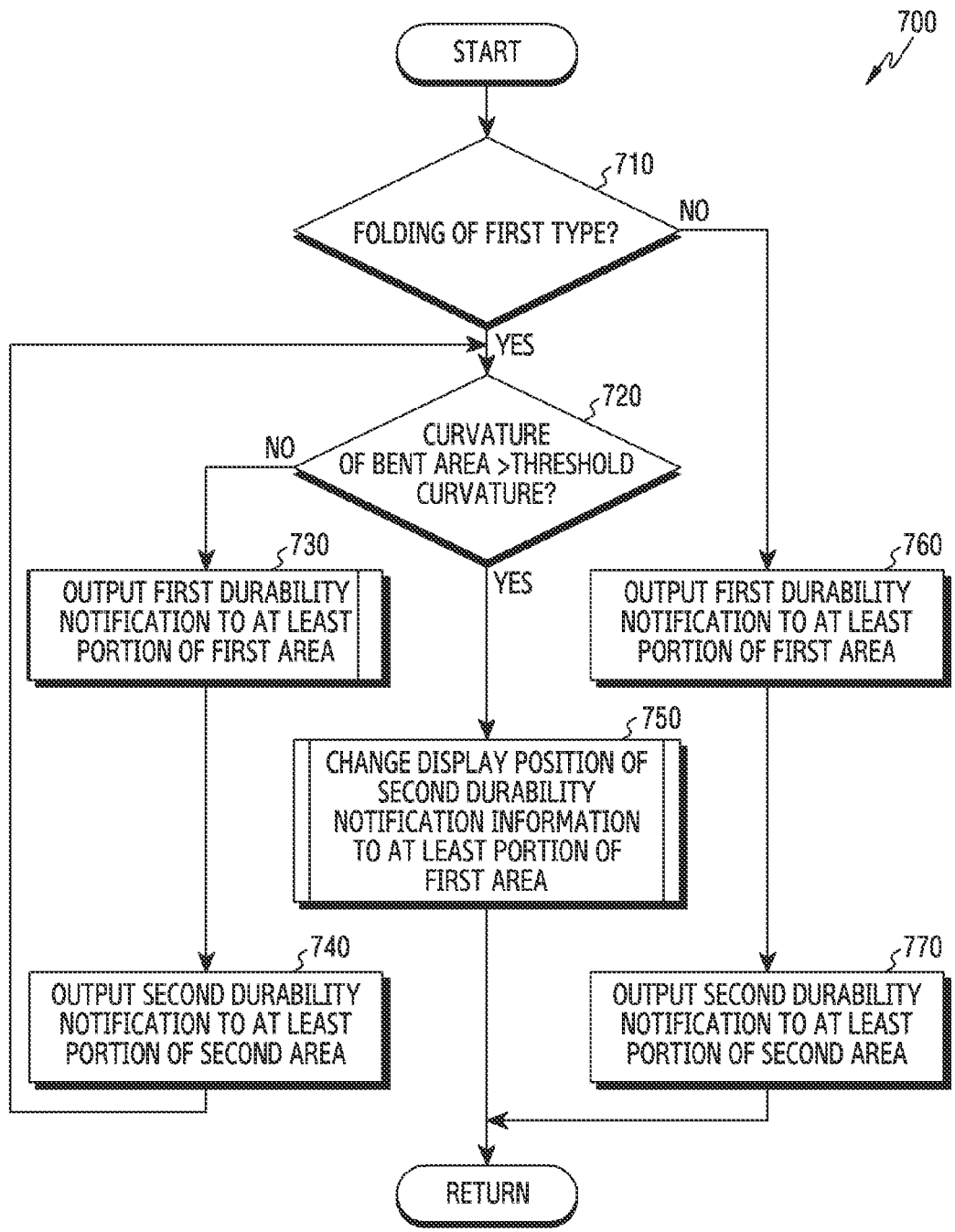
FIG. 7 is a flowchart for outputting a durability notification in an electronic device according to various embodiments.
Figure 8A:
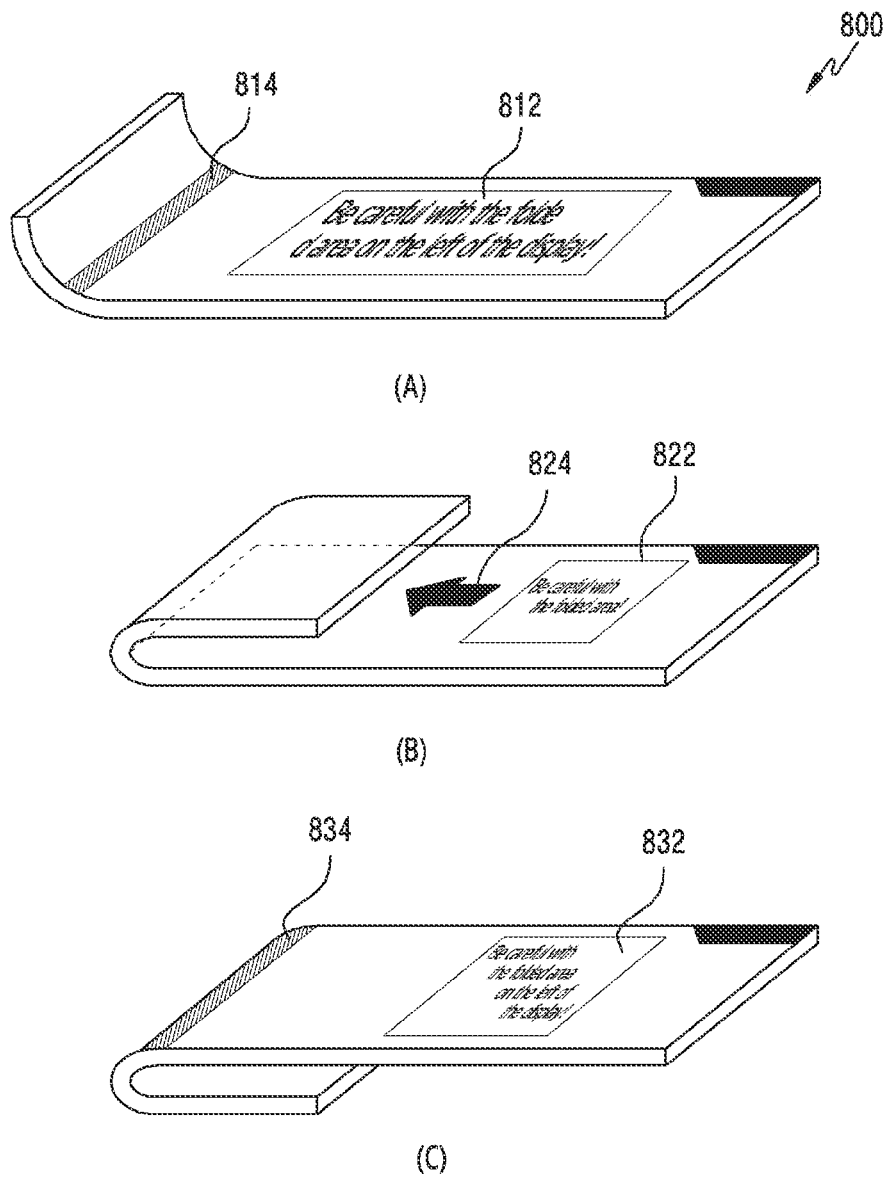
FIGS. 8A and 8B are views to explain a durability notification according to various embodiments.
Figure 8B:
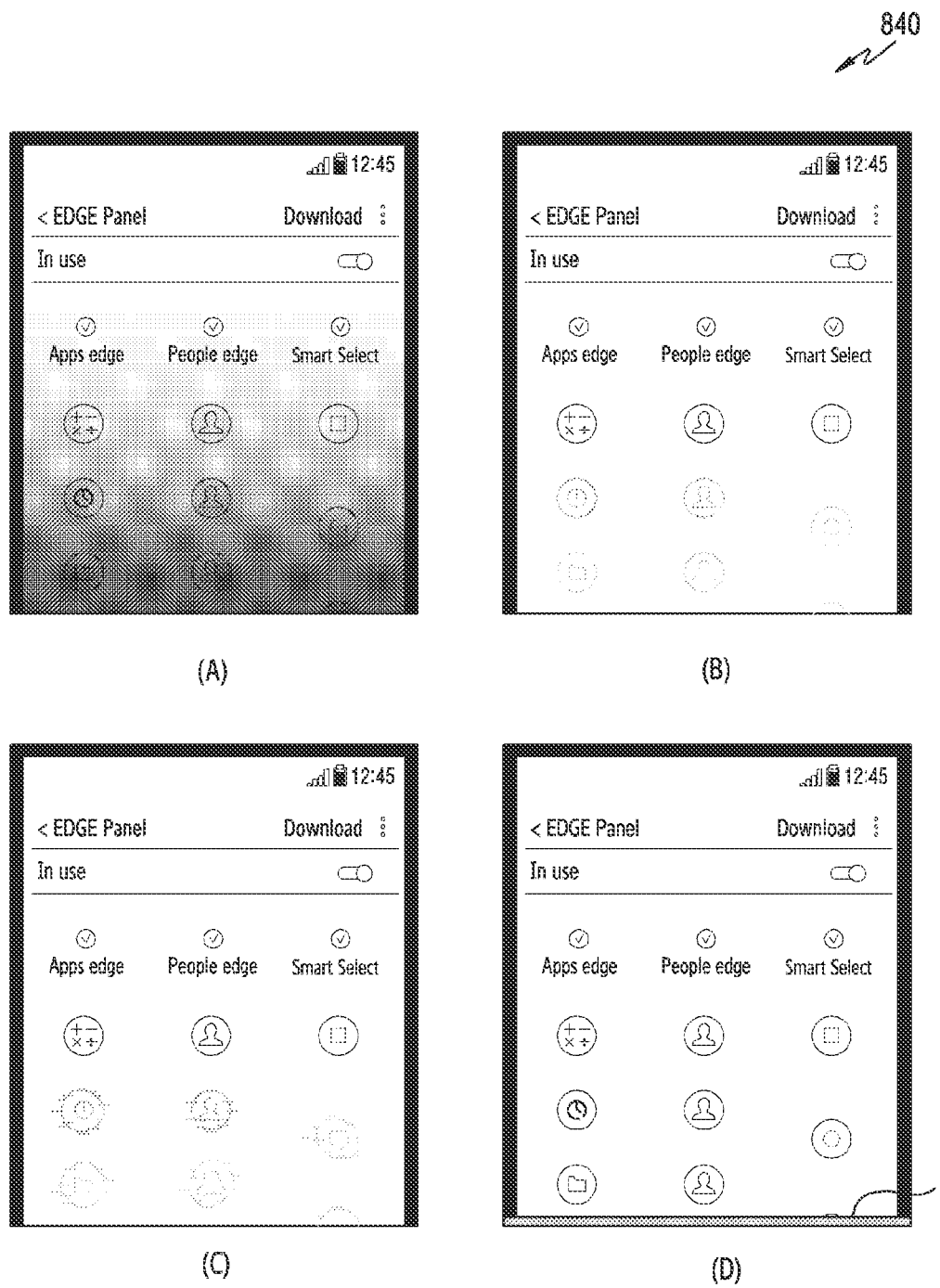

FIG. 7 is a flowchart 700 for outputting a durability notification in an electronic device according to various embodiments. FIGS. 8A and 8B are views 800, 840 to explain a durability notification according to various embodiments. Operations of FIG. 7, which will be described below, may indicate various embodiments of operation 530 of FIG. 5. In the following embodiment, respective operations may be performed in sequence, but may not necessarily be performed in sequence. For example, the sequence of the respective operations may be changed and at least two operations may be performed in parallel. The electronic device of FIG. 7 may be the electronic device 101 of FIG. 1.

Referring to FIG. 7, in operation 710, the electronic device (for example, the processor 120 of FIG. 1) according to various embodiments may determine a folding type of the electronic device 101. The folding type of the electronic device 101 may include folding of a first type (for example, in-folding) by which a portion of the electronic device 101 is folded in a first direction (for example, a front surface direction), and folding of a second type (for example, out-folding) by which a portion of the electronic device 101 is folded in a second direction (for example, a rear surface direction) which is the opposite direction of the first direction. For example, the processor 120 may detect the folding of the first type indicating that the angle between the first housing structure 310 and the second housing structure 320 of the electronic device 101 is included in a pre-designated first angle range (for example, about 5°-175°). In another example, the processor 120 may detect the folding of the second type indicating that the angle between the first housing structure 310 and the second housing structure 320 of the electronic device 101 is included in a pre-designated second angle range (for example, 185°-355°).

According to various embodiments, the electronic device (for example, the processor 102 of FIG. 1) may determine whether an area where folding is detected (for example, a folding area) is exposed in operation 720 in response to the folding of the first type being detected. According to an embodiment, the processor 120 may determine whether the folding area is exposed, based on a curvature of the folding area and a pre-designated threshold curvature. For example, when the curvature of the folding area is greater than or equal to the pre-designated threshold curvature, the processor 120 may determine that the folding area is hidden by a folding surface (for example, the rear surface of the electronic device 101) and is not exposed. In addition, when the curvature of the folding area is less than the pre-designated threshold curvature, the processor 120 may determine that the folding area is not hidden by the folding surface (for example, the rear surface of the electronic device 101) and is exposed. However, this is merely an example and embodiments of the disclosure are not limited thereto. For example, the exposure of the folding area may be detected in well-known various methods. For example, the processor 120 may determine whether the folding area is exposed, by comparing a folding angle of the electronic device 101 and a pre-designated threshold angle.

According to various embodiments, the electronic device (for example, the processor 120 of FIG. 1) may perform operations related to operation 730 and operation 740 for outputting a first durability notification and a second durability notification, in response to it being determined that the folding area is exposed.

According to an embodiment, in operation 730, the processor 120 may output the first durability notification to at least a portion of a first area of a display (for example, the display device 160). The first area may be the other area than the folding area from among all areas of the display (for example, the display device 160). In addition, the first durability notification may be information for informing that durability of at least a portion of the electronic device 101 or the display (for example, the display device 160) may be degraded by frequent folding. For example, as shown in view (a) of FIG. 8A, a first durability notification 812 may include text information (for example, "Be careful with the folded area on the left of the display!"), and may be outputted on at least a portion of the first area of the display (for example, the display device 160) in the form of pop-up. However, this is merely an example and embodiments of the disclosure are not limited thereto. For example, the processor 120 may output the first durability notification based on at least one of vibration, light emission, sound, etc. In addition, in the above-described embodiment, the text information of the first durability notification includes information (for example, the left of the display) for indicating the folding area as shown in view (a) of FIG. 8A, but this is merely an example and the text information of the first durability notification may include only information (for example, "Be careful with the folded area") for informing that durability is degraded.

According to an embodiment, in operation 740, the processor 120 may output the second durability notification to at least a portion of a second area of the display (for example, the display device 160). The second area may be a folding area where folding is detected from among all areas of the display (for example, the display device 160). For example, the second durability notification may be outputted to at least a portion of the folding area. In addition, the second durability notification may indicate one area of the electronic device 101 or the display (for example, the display device 160) where degradation is caused. According to an embodiment, as shown in view (a) of FIG. 8A, a second durability notification 814 may display an area in a shading pattern. However, this is merely an example and embodiments of the disclosure are not limited thereto. For example, as shown in FIG. 8B, the processor 120 may output the second durability notification applying at least one of an effect of adjusting hue in phases with reference to the folding area (for example, Gradation effect) (a), an effect of adjusting brightness of a predetermined area with reference to the folding area (for example, white dim effect) (b), an effect of blurring a predetermined area with reference to the folding area (for example, Blur effect) (c), or an effect of displaying a designated figure (for example, line) 842 on a predetermined area with reference to the folding area (d).

According to various embodiments, the electronic device (for example, the processor 120 of FIG. 1) may continuously or periodically determine whether the exposure of the folding area is stopped while outputting the first durability notification and the second durability notification. For example, the processor 120 may perform an operation associated with at least one of operations 720 to 740.

According to various embodiments, the electronic device (for example, the processor 120 of FIG. 1) may change a display position of the second durability notification to at least a portion of the first area of the display (for example, the display device 160) in operation 750, in response to it being determined that the folding area is not exposed. For example, when the folding area is hidden by the folding surface and is not exposed, a user may not recognize the folding area where durability may be degraded. In this case, the processor 120 may change the display position of the second durability notification to the first area of the display (for example, the display device 160) that is exposed to the user so as to allow the user to recognize the folding area. For example, the second durability notification displayed on the changed position may include information 824 indicating a direction of the folding area as shown in view (b) of FIG. 8A.

According to various embodiments, the electronic device (for example, the processor 120 of FIG. 1) may perform operations related to operation 760 and operation 770 to output the first durability notification and the second durability notification in response to the folding of the second type being detected.

According to an embodiment, in operation 760, the processor 120 may output the first durability notification to at least a portion of the first area of the display (for example, the display device 160). In addition, in operation 770, the processor 120 may output the second durability notification to at least a portion of the second area of the display (for example, the display device 160). For example, as shown in view (c) of FIG. 8A, the first durability notification 832 and the second durability notification 834 may be displayed on at least portions of the first area and the second area of the display (for example, the display device 160), respectively, which are exposed to the user.

Figure 9:
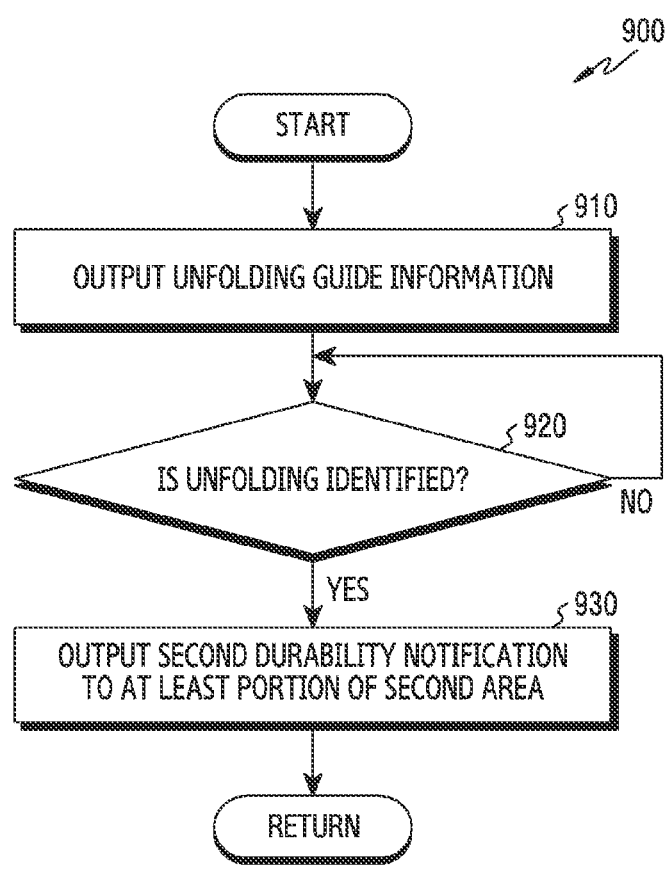
FIG. 9 is a flowchart for outputting a durability notification in a state in which folding of a second type is detected in an electronic device according to various embodiments.
Figure 10:
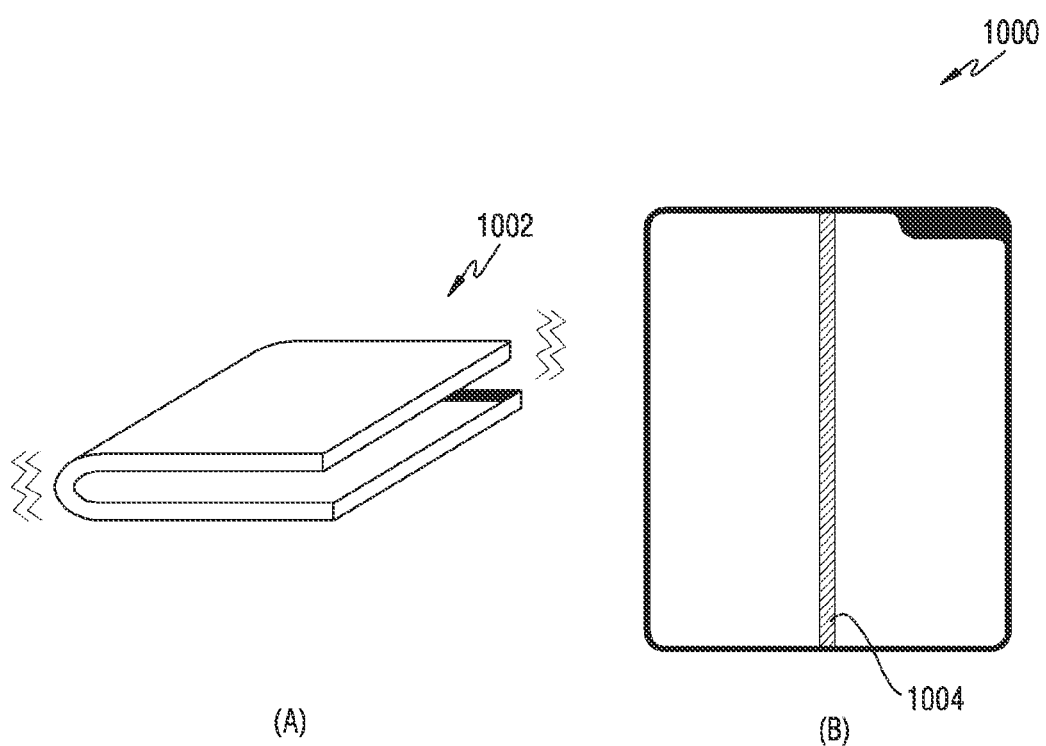
FIG. 10 is a view to explain a durability notification according to various embodiments.

FIG. 9 is a flowchart 900 for outputting a durability notification in a state in which folding of a second type is detected in an electronic device according to various embodiments. FIG. 10 is a view 1000 to explain a durability notification according to various embodiments. Operations of FIG. 9 which will be described below may indicate various embodiments of operation 750 of FIG. 7. In the following embodiment, respective operations may be performed in sequence, but may not necessarily be performed in sequence. For example, the sequence of the respective operations may be changed and at least two operations may be performed in parallel. The electronic device of FIG. 9 may be the electronic device 101 of FIG. 1.

Referring to FIG. 9, in operation 910, the electronic device (for example, the processor 120 of FIG. 1) according to various embodiments may output unfolding guide information in response to it being determined that a folding area is not exposed. The unfolding guide may induce unfolding of the electronic device 101 to expose at least the folding area. For example, as shown in view (a) of FIG. 10, the processor 120 may output unfolding guide information in a vibration form (1002). However, this is merely an example and embodiments of the disclosure are not limited thereto. For example, the processor 120 may output the unfolding guide information based on at least one of light emission, sound, etc.

According to various embodiments, in operation 920, the electronic device example, the processor 102 of FIG. 1) may determine whether the state of the electronic device 101 changes to the unfolding state. According to an embodiment, the processor 120 may determine whether the electronic device is in the flat state to expose at least the folding area. For example, the processor 120 may determine the unfolding state based on a change in a folding angle of the electronic device 101.

According to various embodiments, the electronic device (for example, the processor 102 of FIG. 1) may repeat the operation of determining whether the state of the electronic device 101 is changed to the unfolding state, in response to the state of the folded electronic device 101 being identified.

According to various embodiments, the electronic device (for example, the processor 102 of FIG. 1) may output a second durability notification to at least a portion of a second area of a display (for example, the display device 160) in operation 930 in response to the state of the unfolded electronic device 101 being identified. For example, the processor 120 may output a second durability notification 1004 to at least a portion of the folding area which is exposed by the unfolding of the electronic device 101 as shown in view (b) of FIG. 10.

Figure 11:
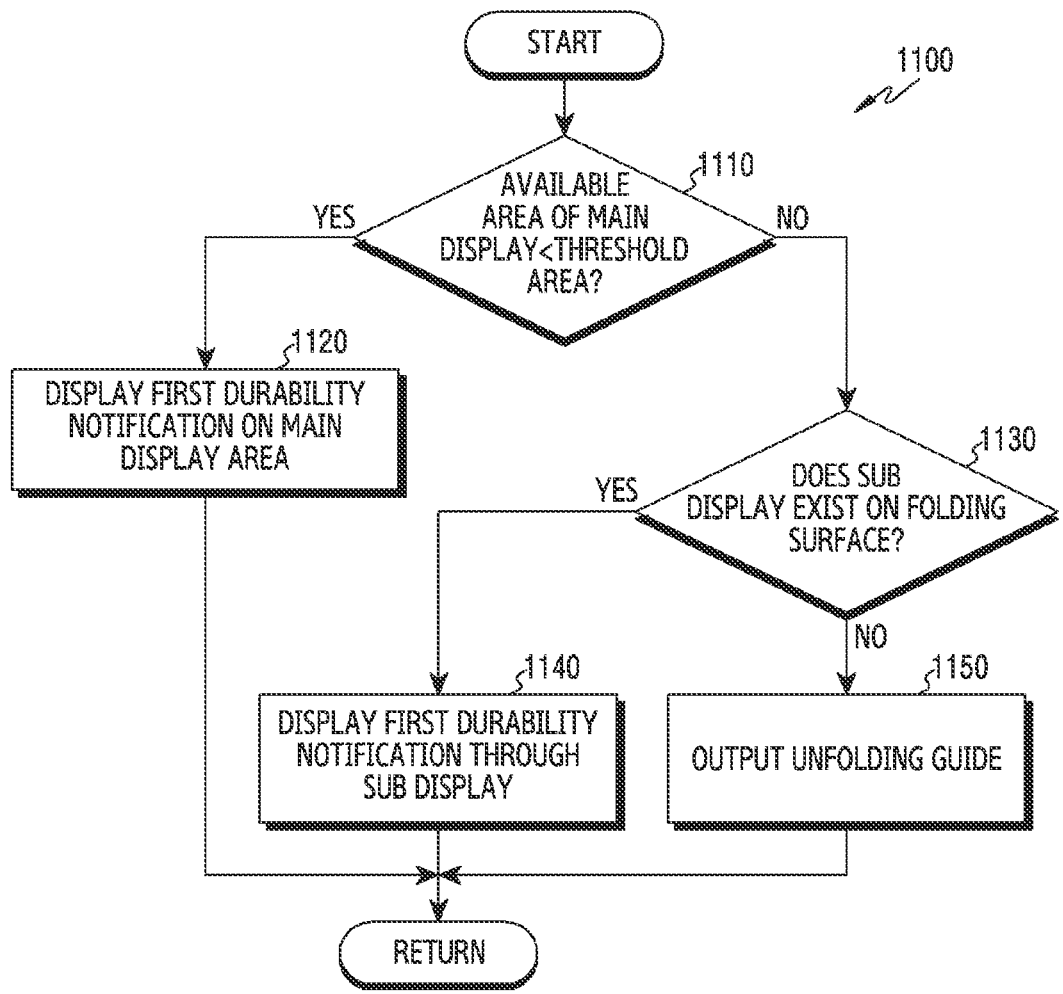
FIG. 11 is a flowchart for outputting a durability notification in a state in which folding of a first type is detected in an electronic device according to various embodiments.
Figure 12A:
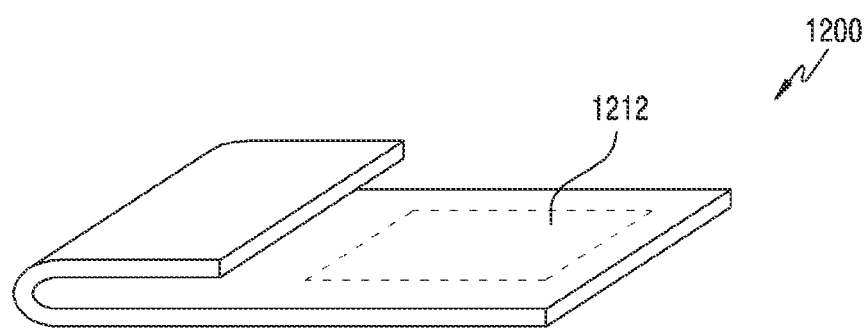
FIGS. 12A to 12C are views to explain a durability notification according to various embodiments.
Figure 12A:
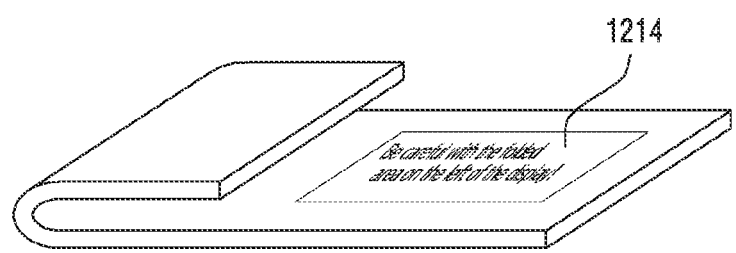
Figure 12B:
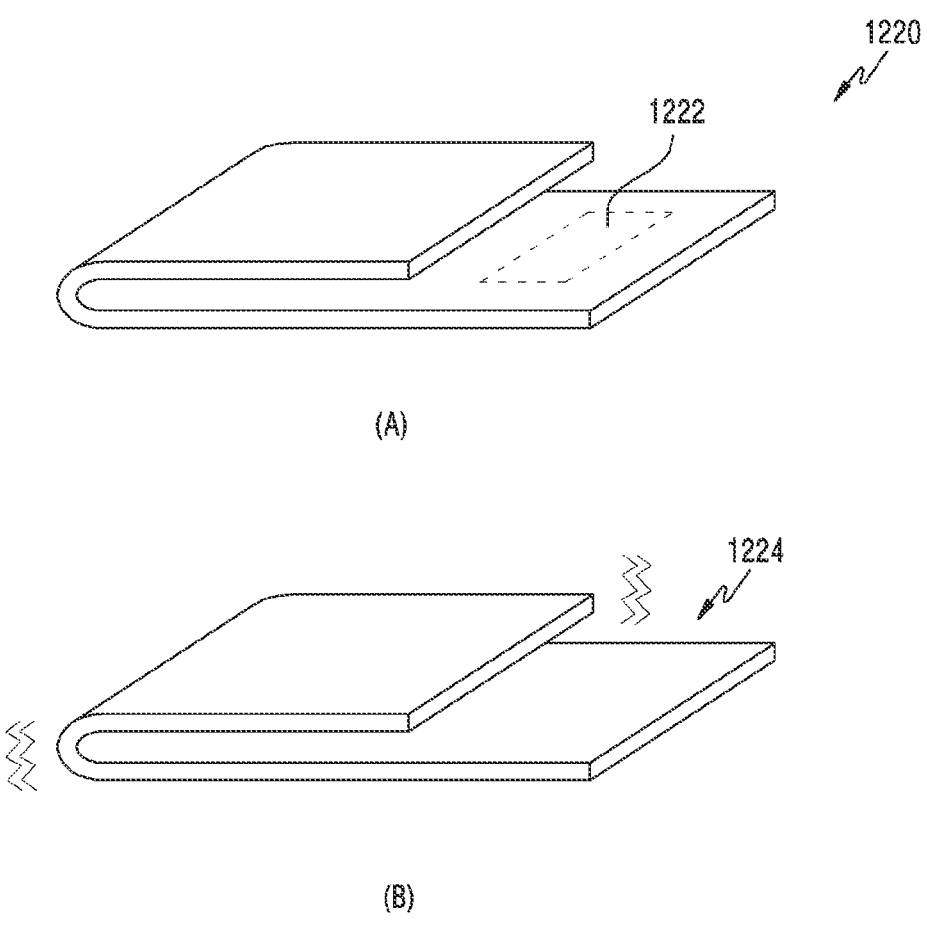
Figure 12C:
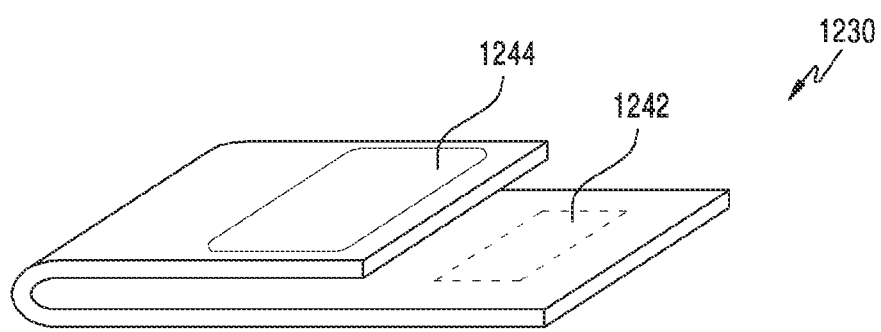
Figure 12C:
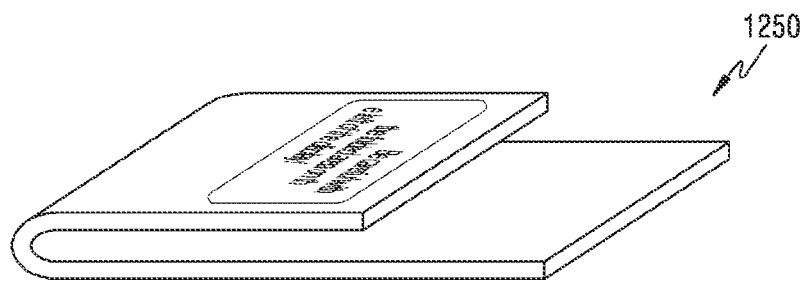

FIG. 11 is a flowchart 1100 for outputting a durability notification in a state where folding of a first type is detected in an electronic device according to various embodiments. FIGS. 12A to 12C are views 1200, 1220, 1230 to explain a durability notification according to various embodiments. Operations of FIG. 11 which will be described below may indicate various embodiments of operation 730 of FIG. 7. In the following embodiment, the respective operations may be performed in sequence, but may not necessarily be performed in sequence. For example, the sequence of the respective operations may be changed and at least two operations may be performed in parallel. The electronic device of FIG. 11 may be the electronic device 101 of FIG. 1.

Referring to FIG. 11, in operation 1110, the electronic device (for example, the processor 120 of FIG. 1) according to various embodiments may identify an available area of a main display that is not hidden by a folding surface. The main display may be disposed on a first surface (for example, a front surface) of the electronic device 101. For example, the processor 120 may determine whether a size of the available area of the main display is greater than or equal to a threshold area.

According to various embodiments, when the size of the available area of the main display is greater than or equal to the threshold area, the electronic device (for example, the processor 102 of FIG. 1) may display a first durability notification on the main display area in operation 1120. As described above, the first durability notification may be information for informing that durability of at least a portion of the electronic device 101 or the display (for example, the display device 160) may be degraded by frequent folding. For example, when a size 1212 of the available area of the main display is guaranteed to the extent of displaying the first durability notification as shown in view (a) of FIG. 12A, the processor 120 may output the first durability notification (for example, text information for cautioning about the folded area) 1214 through the main display area as shown in view (h) of FIG. 12A.

According to various embodiments, when the size of the available area of the display is less than the threshold area, the electronic device (for example, the processor 102) may determine whether a sub display exists on a folding surface in operation 1130. According to an embodiment, the existence of the sub display on the folding surface may include exposure of the sub display caused by folding. The sub display may be disposed on a second surface (for example, a rear surface) which is the opposite surface of the first surface of the electronic device 101.

According to various embodiments, when the sub display exists on the folding surface, the electronic device (for example, the processor 102 of FIG. 1) may display the first durability notification through the sub display in operation 1140. For example, when the size of the available area of the main display is not guaranteed to the extent of displaying the first durability notification (1242) or the sub display 1244 exists on the folding surface as shown in view (a) of FIG. 12C, the processor 120 may output the first durability notification (for example, text information for cautioning about the folded area) through the sub display area as shown in view (b) of FIG. 12C (1250).

According to various embodiments, when the sub display does not exist on the folding surface, the electronic device (for example, the processor 102 of FIG. 1) may output unfolding guide in operation 1150. The unfolding guide may guide the main display or the sub display to be exposed to the extent of displaying a durability notification. For example, when the size of the available area of the main display is not guaranteed to the extent of displaying the first durability notification (1222) or the sub display does not exist on the folding surface as shown in view (a) of FIG. 12B, the processor 120 may output the unfolding guide in the form of vibration (1220). As described above, the unfolding guide may be generated in the form of at least one of light emission, sound. In addition, the processor 120 may display the first durability notification through at least a portion of the main display or the sub display exposed in response to the unfolding state of the electronic device 101 being detected.

Figure 13:
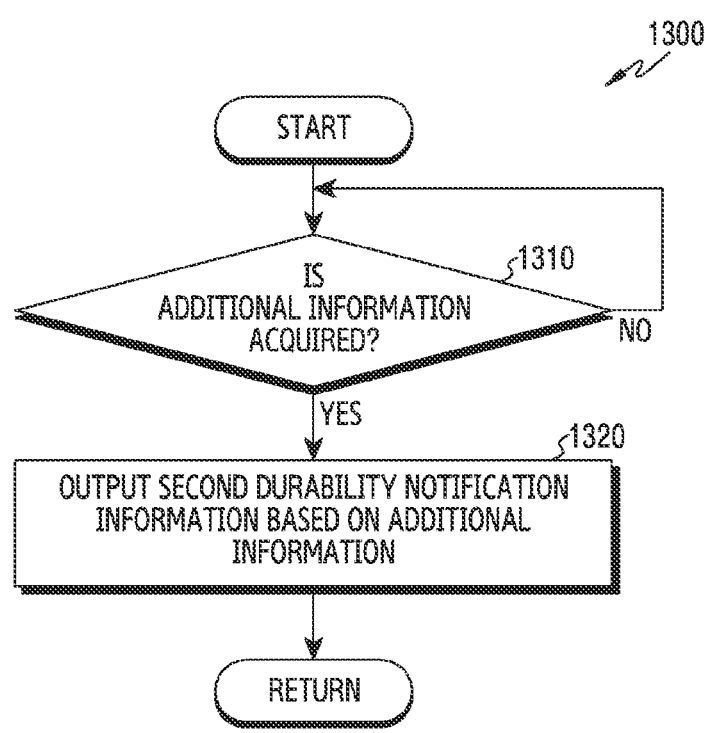
FIG. 13 is a flowchart for outputting a durability notification in an electronic device according to various embodiments.
Figure 14:
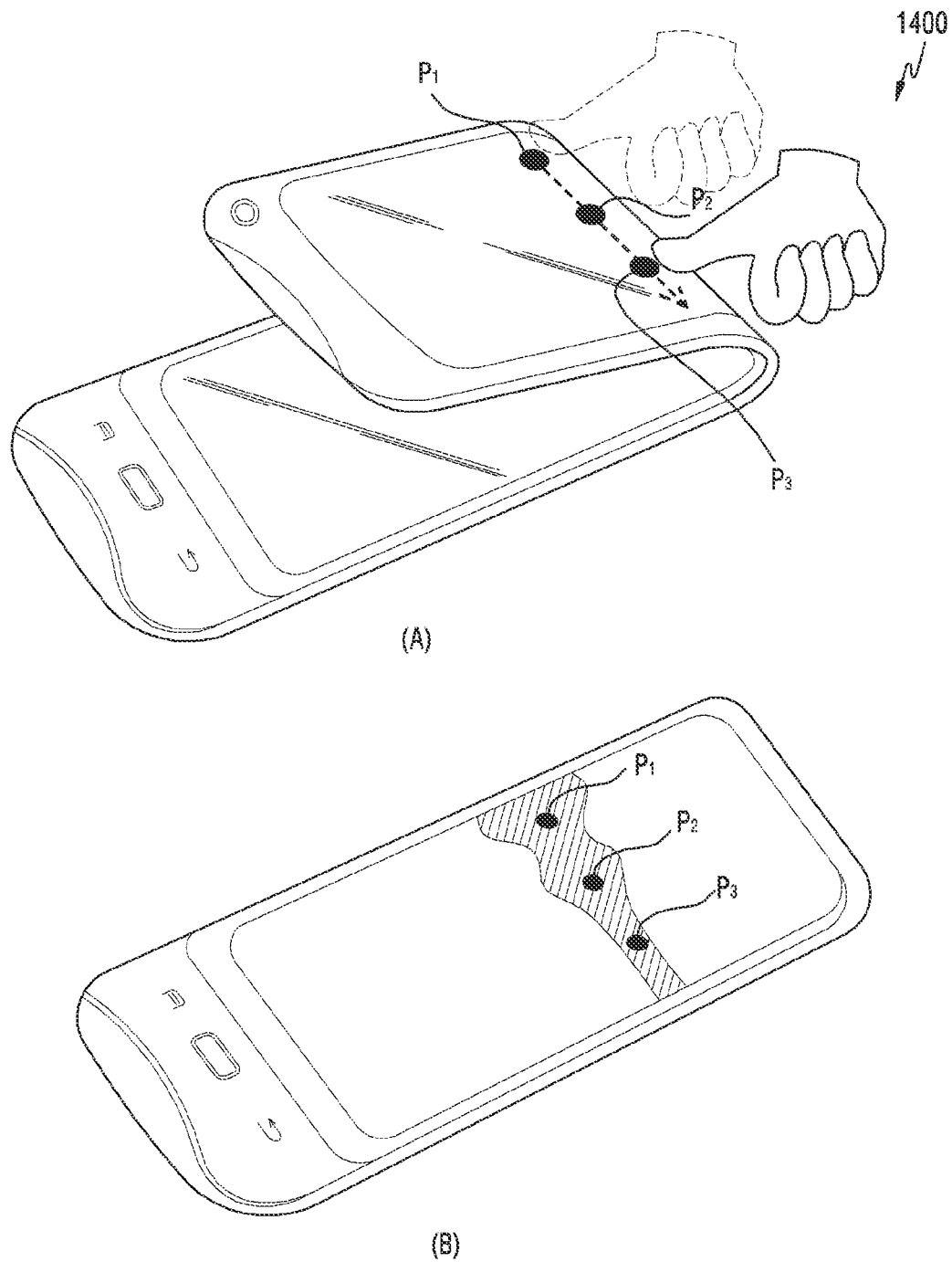
FIG. 14 is a view to explain a durability notification according to various embodiments.

FIG. 13 is a flowchart 1300 for outputting a durability notification in an electronic device according to various embodiments. FIG. 14 is a view 1400 to explain a durability notification according to various embodiments. Operations of FIG. 13 which will be described below may indicate various embodiments operation 540 of FIG. 5, operations 740, 750, 770 of FIG. 7, operation 930 of FIG. 9. In the following embodiment, respective operations may be performed in sequence, but may not necessarily be performed in sequence. For example, the sequence of the respective operations may be changed and at least two operations may be performed in parallel. The electronic device of FIG. 13 may be the electronic device 101 of FIG. 1.

Referring to FIG. 13, in operation 1310, the electronic device (for example, the processor 120 of FIG. 1) according to various embodiments may determine whether additional information is acquired in a state where folding of the electronic device 101 is detected. The additional information may be associated with a pressure applied to a folding area.

According to various embodiments, the electronic device (for example, the processor 102 of FIG. 1) may output a second durability notification based on additional information in operation 1320 in response to the additional information being acquired. For example, when a user presses from a first section (for example, point P1 to point P2) to a third section (for example, a section after point P3) on a folding surface of the electronic device 101 while changing strength of a pressure as shown in view (a) of FIG. 14, the processor 120 may output the second durability notification to correspond to a strength of a pressure detected from each section. For example, as shown in view (b) of FIG. 14, the processor 120 may display the second durability notification at a first level on the first section (for example, point P1 to point P2) where the pressure of first strength is detected (for example, displaying a wide area), and may display the second durability notification at a second level which is smaller than the first level on the second section (for example, point P2 to point P3) where the pressure of second strength, smaller than the pressure of the first strength, is detected (for example, displaying an intermediate area). In addition, the processor 120 may display the second durability notification at a third level smaller than the second level on the third section (for example, the section after point P3) where the pressure of third strength, smaller than the pressure of the second strength, is detected (for example, displaying a thin area).

Figure 15:
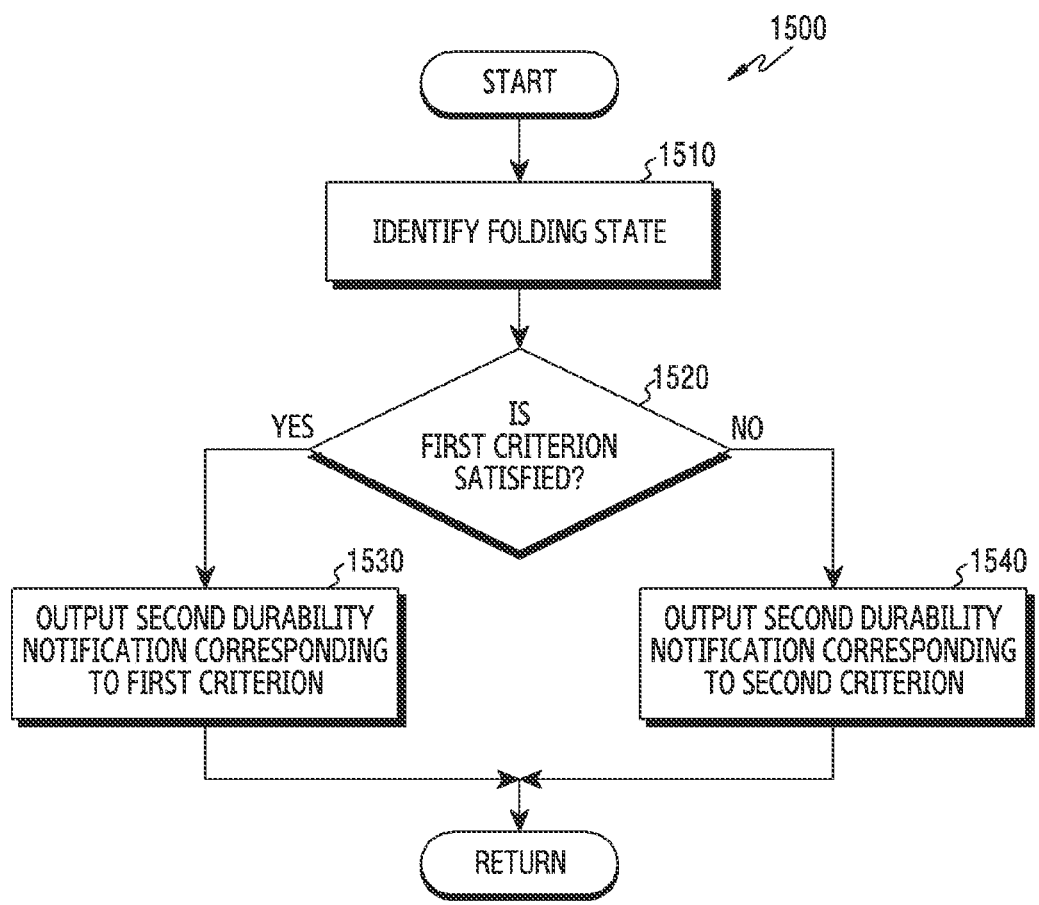
FIG. 15 is another flowchart for outputting a durability notification in an electronic device according to various embodiments.
Figure 16A:
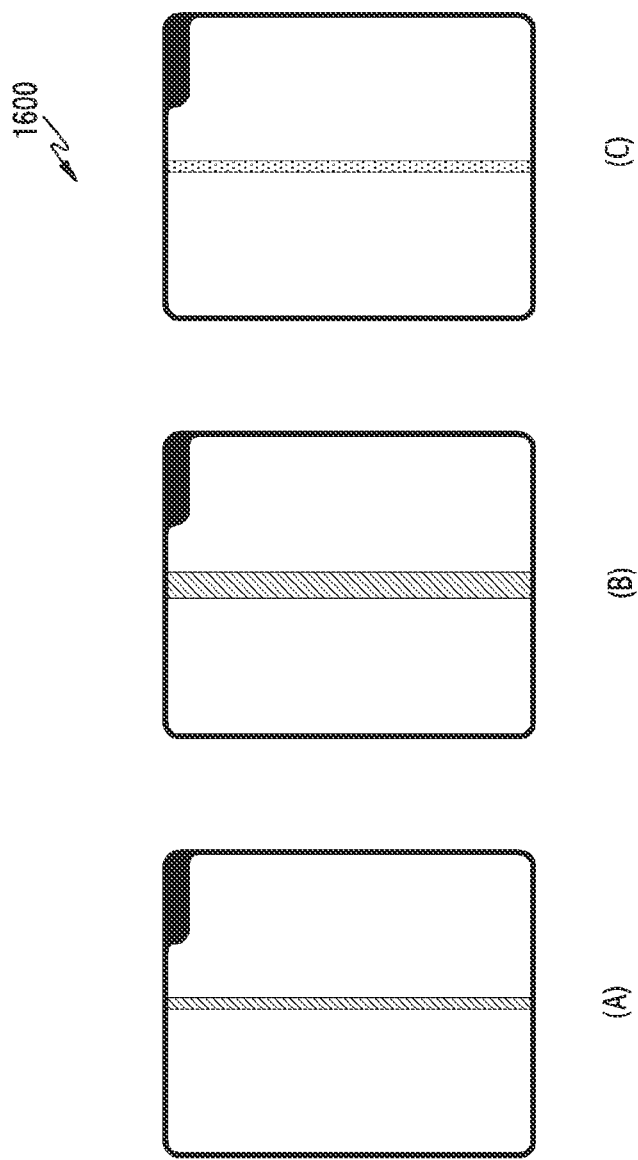
FIGS. 16A and 16B are views to explain a durability notification according to various embodiments.
Figure 16B:
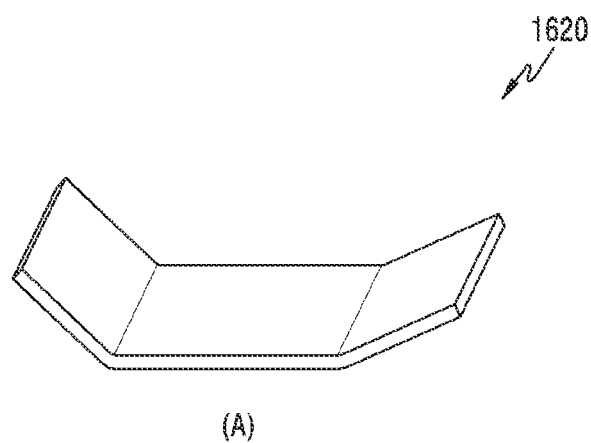
Figure 16B:
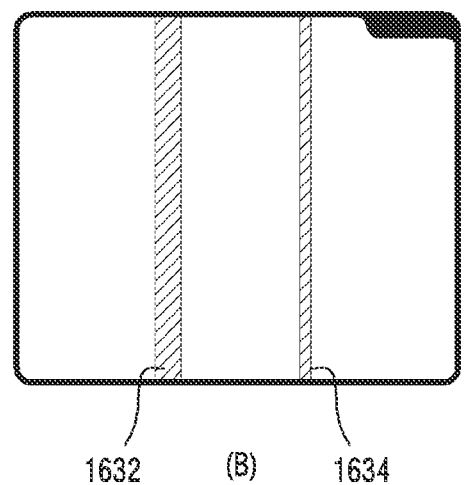

FIG. 15 is another flowchart 1500 for outputting a durability notification in an electronic device according to various embodiments. FIGS. 16A and 16B are views 1600 to explain a durability notification according to various embodiments. Operations of FIG. 13, which will be described below, may indicate various embodiments of operation 540 of FIG. 5, operations 740, 750, 770 of FIG. 7, operation 930 of FIG. 9. In the following embodiment, respective operations may be performed in sequence, but may not necessarily be performed in sequence. For example, the sequence of the respective operations may be changed and at least two operations may be performed in parallel. The electronic device of FIG. 15 may be the electronic device 101 of FIG. 1.

Referring to FIG. 15, in operation 1510, the electronic device (for example, the processor of FIG. 1) according to various embodiments may identify a folding state of the electronic device 101. The folding state may be associated with a degree of folding. For example, the folding state may include a weak folding state in which a folding angle of the electronic device 101 is included in a first state range (for example, 5° to 45°), and a strong folding state in which the folding angle of the electronic device 101 is included in a second state range (for example, 70° to 90°. However, this is merely an example and embodiments of the disclosure are not limited thereto. For example, the folding state may include an intermediate folding state referring to an intermediate state between the strong folding state and the weak folding state.

According to various embodiments, in operation 1520, the electronic device (for example, the processor 102 of FIG. 1) may determine whether the folding state of the electronic device 101 satisfies a first criterion or the folding state satisfies a second criterion. The first criterion may be associated with the weak folding state, and the second criterion may be associated with the strong folding state.

According to various embodiments, when the folding state of the electronic device 101 satisfies the first criterion, the electronic device (for example, the processor 102 of FIG. 1) may output a second durability notification corresponding to the first criterion in operation 1520. According to an embodiment, the processor 120 may output the second durability notification which refers to the weak folding state. For example, as shown in view (a) of FIG. 16A, the processor 120 may output the second durability notification having a first area. However, this is merely an example and embodiments of the disclosure are not limited thereto. For example, the processor 120 may inform the weak folding state by outputting the second durability notification having a first color.

According to various embodiments, when the folding state of the electronic device 101 satisfies the second criterion, the electronic device (for example, the processor 102 of FIG. 1) may output the second durability notification corresponding to the second criterion in operation 1520. According to an embodiment, the processor 120 may output the second durability notification referring to the strong folding state. For example, as shown in view (b) of FIG. 16A, the processor 120 may output the second durability notification having an area larger than the first area. However, this is merely an example and embodiments of the disclosure are not limited thereto. For example, the processor 120 may output the second durability notification corresponding to the second criterion, which is distinct from the second durability notification corresponding to the first criterion, by using well-known various output methods. For example, as shown in view (c) of FIG. 16A, the processor 120 may output the second durability notification formed in a different pattern from the second durability notification corresponding to the first criterion.

FIG. 15 described above illustrates an embodiment in which the durability notification on a single folding area is displayed in the electronic device 101. However, this is merely an example and embodiments of the disclosure are not limited thereto. For example, the electronic device 101 may display durability notifications on a plurality of folding areas. For example, as shown in view (a) of FIG. 16B, the processor 120 may detect folding of a plurality of folding areas of the electronic device 101. In addition, the processor 120 may display the second durability notification based on a folding state of each folding area. For example, as shown in view (b) of FIG. 16B, the processor 120 may display the second durability notification corresponding to the first criterion in a first folding area in which a folding state (for example, weak folding) satisfying the first criterion is identified, and may display the second durability notification corresponding to the second criterion in a second folding area in which a folding state (for example, strong folding) satisfying the second criterion is identified.

According to various embodiments, an operating method of an electronic device (for example, the electronic device 101) may include: detecting folding of the electronic device based on an angle detected through at least one sensor circuit (for example, the sensor module 176); identifying a folding history of the electronic device in response to the folding of the electronic device being detected; determining a possibility that durability of a folding area is degraded, based on the folding history; and outputting a durability notification in response to it being determined that there is a possibility that the durability of the folding area is degraded.

According to an embodiment, the durability notification may include a first durability notification for informing that durability of the folding area is degraded, and a second durability notification for indicating the folding area where the durability is degraded.

According to an embodiment, outputting the durability notification may include determining a display method of the durability notification, based on a folding type of the electronic device. For example, the folding type of the electronic device may include folding of a first type by which a portion of the electronic device is folded in a first direction, and folding of a second type by which a portion of the electronic device is folded in a second direction which is the opposite direction of the first direction.

According to an embodiment, outputting the durability notification may include displaying the first durability notification and the second durability notification on a first area which is different from a second area of the flexible display (for example, the display device 160, based on the folding of the first type. For example, the second area may include some areas corresponding to a position of the hinge from among all areas of the flexible display.

According to an embodiment, outputting the durability notification may include outputting the first durability notification through a sub display (for example, the sub display 290) in response to the sub display being exposed by folding of the electronic device.

According to an embodiment outputting the durability notification may include: outputting guide information for inducing a flat state of the electronic device which is folded in the first type; and changing a display position of the second durability notification to the second area of the flexible display in response to the flat state of the electronic device being detected.

According to an embodiment, the guide information may be outputted based on at least one of vibration, light emission, or sound.

According to an embodiment, outputting the durability notification may include: displaying the first durability notification on a first area of the flexible display, based on the folding of the second type; and displaying the second durability notification on a second area of the flexible display. For example, the first area may include some areas corresponding to a position of the hinge from among all areas of the flexible display, and the second area may be an area different from the first area.

According to an embodiment, outputting the durability notification may include: acquiring additional information regarding the folding area in response to it being determined that there is a possibility that durability of the folding area is degraded; and outputting the durability notification based on the additional information. For example, the additional information may include a pressure applied to the folding area.

According to an embodiment, outputting the durability notification may include identifying a folding state of the electronic device in response to it being determined that there is a possibility that durability of the folding area is degraded, and outputting the durability notification based on the identified folding state. For example, the folding state may include a weak folding state in which an angle formed by the first housing and the second housing is included in a first state range, and a strong folding state in which the angle formed by the first housing and the second housing is included in a second state range.

While specific embodiments have been described in the detailed descriptions of the disclosure, it will be understood by those skilled in the art that various changes in form and details may be made therein without departing from the spirit and scope of the disclosure as defined by the appended claims. Therefore, the scope of various embodiments of the disclosure is defined not by the described embodiments but by the appended claims or the equivalents to the claims.

The invention claimed is:

1. An electronic device comprising:
a hinge;
a first housing comprising a first surface facing in a first direction and a third surface facing in a second direction which is an opposite direction of the first direction;
a second housing comprising a second surface facing in the first direction and a fourth surface facing in the second direction, the second housing being rotated with respect to the first housing with reference to the hinge according to a folding type selected from a plurality of folding types including an in-folding type and an out-folding type, wherein at least one of the third surface of the first housing or the fourth surface of the second housing comprises a sub display;
a flexible display extended from the first surface to the third surface;
a memory;
at least one sensor circuit configured to detect an angle formed by the first housing and the second housing; and
a processor,
wherein the memory stores instructions that, when executed by the processor, cause the electronic device to control to:
detect folding of the electronic device based on an angle detected through the sensor circuit;
determine a folding area in which the folding is detected and a possibility that durability of the folding area is degraded, based on a folding history of the electronic device; and
output a durability notification in response to it being determined that there is the possibility that the durability of the folding area is degraded,
wherein the durability notification comprises a first durability notification informing occurring of the durability of the folding area being degraded and a second durability notification indicating a position of the folding area where the durability is degraded;
determine a displaying method of the durability notification based on the folding type of the electronic device, wherein the folding type of the electronic device includes the in-folding type by which a portion of the electronic device is folded in the first direction, and the out-folding type by which the portion of the electronic device is folded in the second direction which is the opposite direction of the first direction,
display, on the flexible display, the first durability notification on an area which is different from the folding area on the flexible display and the second durability notification on the folding area on the flexible display, according to the displaying method determined based on the portion of the electronic device being folded by the out-folding type, and
display, on the sub display, the first durability notification, without displaying the second durability notification, according to the displaying method determined based on the portion of the electronic device being folded by the in-folding type.

2. The electronic device of claim 1, wherein the instructions that, when executed by the processor, further cause the electronic device to control to output guide information for inducing a flat state of the electronic device which is folded in a first type, and to change a display position of the second durability notification to the folding area of the flexible display in response to the flat state of the electronic device being detected.

3. The electronic device of claim 1, wherein the instructions that, when executed by the processor, further cause the electronic device to control to acquire additional information regarding the folding area in response to it being determined that there is a possibility that durability of the folding area is degraded, and to output the durability notification based on the additional information, and
wherein the additional information comprises a pressure applied to the folding area.

4. The electronic device of claim 1, wherein the instructions that, when executed by the processor, further cause the electronic device to control to identify a folding state of the electronic device in response to it being determined that there is a possibility that durability of the folding area is degraded, and to output the durability notification based on the identified folding state, and
wherein the folding state comprises a weak folding state in which an angle formed by the first housing and the second housing is included in a first state range, and a strong folding state in which the angle formed by the first housing and the second housing is included in a second state range.

5. An operating method of an electronic device, the method comprising:
detecting folding of the electronic device based on an angle detected through at least one sensor circuit;
identifying a folding history of the electronic device in response to the folding of the electronic device being detected;
determining a folding area in which the folding is detected and a possibility that durability of the folding area is degraded, based on the folding history;
outputting a durability notification in response to it being determined that there is the possibility that the durability of the folding area is degraded,
wherein the durability notification comprises a first durability notification informing occurring of the durability of the folding area being degraded and a second durability notification indicating a position of the folding area where the durability is degraded;

determining a displaying method of the durability notification based on a folding type of the electronic device, wherein the folding type of the electronic device includes an in-folding type by which a portion of the electronic device is folded in a first direction, and an out-folding type by which the portion of the electronic device is folded in a second direction which is an opposite direction of the first direction, displaying, on the flexible display, the first durability notification on an area which is different from the folding area on the flexible display and the second durability notification on the folding area on the flexible display, according to the displaying method determined based on the portion of the electronic device being folded by the out-folding type, and displaying, on a sub display, the first durability notification, without displaying the second durability notification, according to the displaying method determined based on the portion of the electronic device being folded by the in-folding type.

6. The method of claim 5, wherein outputting the durability notification comprises:

outputting guide information for inducing a flat state of the electronic device which is folded in a first type; and changing a display position of the second durability notification to the folding area of the flexible display in response to the flat state of the electronic device being detected.

7. The method of claim 5, wherein outputting the durability notification comprises:

acquiring additional information regarding the folding area in response to it being determined that there is the possibility that durability of the folding area is degraded; and outputting the durability notification based on the additional information, and wherein the additional information comprises a pressure applied to the folding area.

* * * * *